United States Patent [19]

Takaoka et al.

[11] Patent Number: 5,266,992
[45] Date of Patent: Nov. 30, 1993

[54] ZOOM LENS CAMERA HAVING MACRO PHOTOGRAPHING FUNCTION

[75] Inventors: Yukio Takaoka; Shinsuke Kohmoto; Susao Nakamura; Katsuhiko Nozaki; Tetsuya Abe; Tadao Kato; Kazumoto Takakusagi, all of Tokyo, Japan

[73] Assignee: Asahi Kogaku Kogyo Kabushiki Kaisha, Tokyo, Japan

[21] Appl. No.: 655,344

[22] Filed: Feb. 14, 1991

[30] Foreign Application Priority Data

Feb. 14, 1990 [JP] Japan .................. 2-13289[U]
Feb. 14, 1990 [JP] Japan .................. 2-13290[U]
Feb. 14, 1990 [JP] Japan .................. 2-13291[U]
Feb. 14, 1990 [JP] Japan .................. 2-13296[U]

[51] Int. Cl.$^5$ .................................... G03B 3/00
[52] U.S. Cl. .............................. 354/199; 354/222
[58] Field of Search ................... 354/199-201, 354/219, 221, 222, 224, 225, 80, 295, 195.1, 195.12; 359/693, 705

[56] References Cited

U.S. PATENT DOCUMENTS

| | | | |
|---|---|---|---|
| 2,951,429 | 9/1960 | Leong | 354/202 |
| 3,534,672 | 10/1970 | Ono | 354/222 |
| 3,641,900 | 2/1972 | Ataka et al. | 354/221 |
| 3,651,735 | 3/1972 | Hiruma | 354/221 |
| 3,961,344 | 6/1976 | Baisch et al. | 354/222 |
| 4,129,369 | 12/1978 | Kobayashi et al. | 354/221 |
| 4,588,275 | 5/1986 | Van Der Meer | 354/150 |
| 4,697,901 | 10/1987 | Wakabayashi et al. | 354/222 |
| 4,717,933 | 1/1988 | Ando et al. | 354/195.1 |
| 4,847,647 | 7/1989 | Ueda | 354/195.1 |
| 4,944,030 | 7/1990 | Haraguchi et al. | 354/222 |
| 4,967,219 | 10/1990 | Morisawa et al. | 354/221 |

FOREIGN PATENT DOCUMENTS

| | | |
|---|---|---|
| 3412674 | 10/1984 | Fed. Rep. of Germany . |
| 59-74534 | 4/1984 | Japan . |
| 60-23838 | 2/1985 | Japan . |
| 62-264034 | 11/1987 | Japan . |
| 677639 | 8/1952 | United Kingdom . |
| 911205 | 11/1962 | United Kingdom . |
| 1170853 | 11/1969 | United Kingdom . |
| 1452357 | 10/1976 | United Kingdom . |
| 1578314 | 11/1980 | United Kingdom . |
| 1593349 | 7/1981 | United Kingdom . |
| 2144865 | 3/1985 | United Kingdom . |
| 2225870 | 6/1990 | United Kingdom . |

OTHER PUBLICATIONS

English Language Abstract of Japanese Publication Nos. 59-74534 and 60-23838.

*Primary Examiner*—David M. Gray
*Attorney, Agent, or Firm*—Sandler Greenblum & Bernstein

[57] ABSTRACT

A camera is provided having a finder optical system, a photographing optical system separate from the finder optical system, and a macro photographing mode. The camera includes a movable field frame which is normally located at an inoperative position in which it is retracted from an optical axis of the finder optical system, and which is moved to an operative position in which the movable field frame is in the finder optical axis in association with the transfer into the macro photographing mode. The movable field frame is provided with a field opening corresponding to a photographing range of the photographing optical system.

37 Claims, 24 Drawing Sheets

FIG. 1
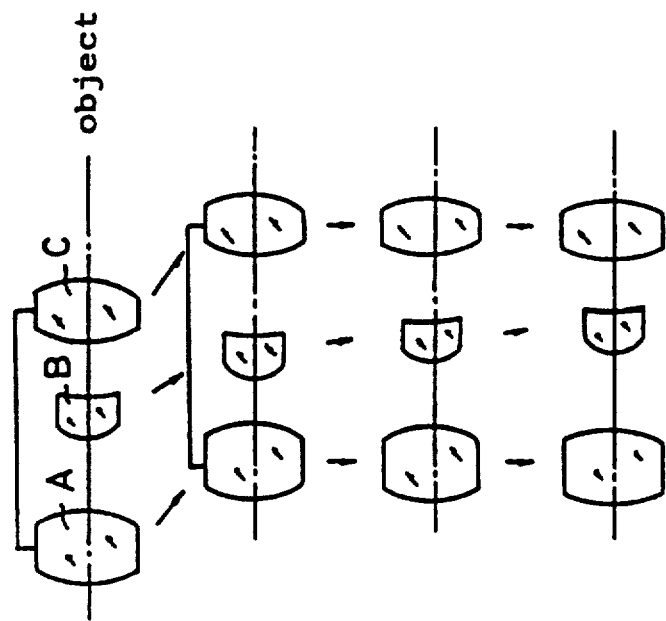
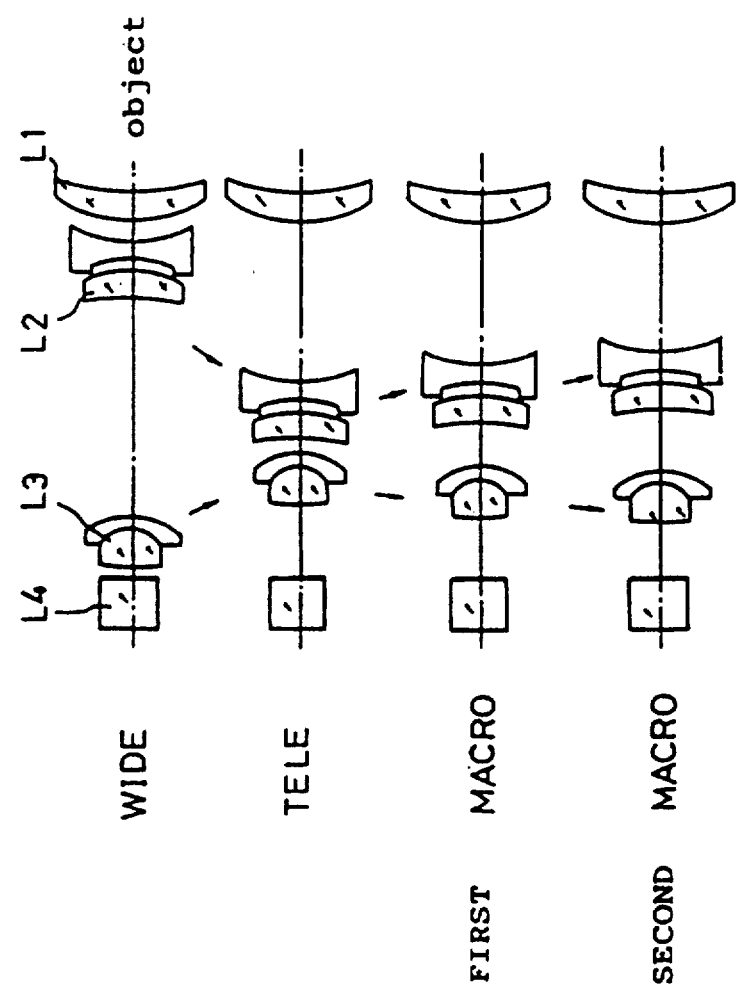

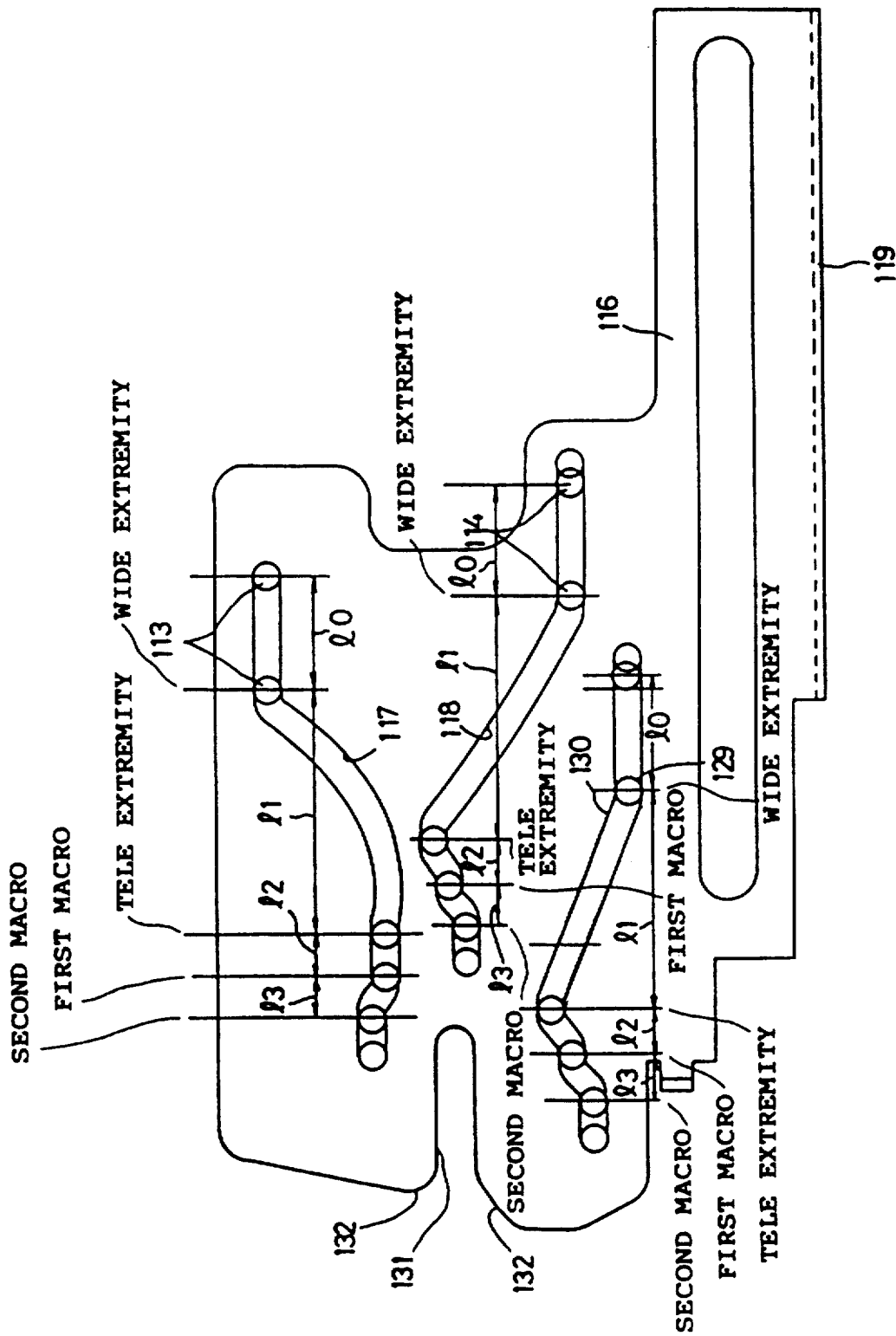

TELE ← 122b → Wide

Tags,992

ZOOM LENS CAMERA HAVING MACRO PHOTOGRAPHING FUNCTION

BACKGROUND OF THE INVENTION

1. Field of the Invention

The present invention relates to a zoom lens camera provided with a finder optical system separate from a photographing optical system, and in addition, having a macro photographing function.

2. Description of Related Art

In a camera having a finder optical system separate from the photographing optical system, a parallax inevitably occurs which becomes particularly large in a camera having a macro photographing function. To compensate the parallax, a camera with a macro function is usually equipped with a macro frame (bright frame) in the finder to indicate the photographing range of the macro mode. However, generally speaking, the macro frame is hard to see, so that it is difficult particularly for a beginner to use the macro frame effectively.

Even with the macro photographing function of a zoom lens camera in which the lens group is partly or wholly advanced beyond one of two extremities of the zooming range (usually, at the telephoto extremity) so that a picture of an object located at a closer distance than the shortest object distance at the regular zooming range can be taken, only a picture of an object within the limit of the macro photographing range can be taken. In other words, no picture of an object closer to the camera than the limit can be taken.

SUMMARY OF THE INVENTION

The primary object of the present invention is to provide a finder device in which the photographing range of the macro mode can be clearly indicated.

Another object of the present invention is to provide a finder device in which different sizes of finder fields of view can be easily obtained.

Still another object of the present invention is to provide a camera having a macro photographing function in which a picture of an object closer to the camera and falling outside of the macro photographing range can be taken.

Still another object of the present invention is to provide a zoom lens camera in which the photographing range of the macro mode can always be observed through the finder.

According to one aspect of the present invention, a provision is made for a field frame which is movable between a retracted position (inoperative position), in which it is retracted from the optical path of the finder, and an operative position, in which the field frame is located on the finder optical path. The field frame is provided with a field opening which makes the finder field of view smaller when the field frame is in the retracted position.

With this arrangement, in a camera having a macro photographing function, the movable field frame is moved to the operative position upon transfer to the macro photographing mode, and only an object within the photographing range can be observed through the finder.

More specifically, in a camera having a macro photographing mode, the movable field frame which is normally located in the retracted position (inoperative position) is moved to the operative position only when the macro photographing mode is effected, and the movable field frame is provided with the field opening corresponding to the photographing range of the photographing optical system in the macro photographing mode.

It is possible to provide a variable power lens in the finder optical system to vary the magnification (power) thereof. Upon transfer to the macro photographing mode, the variable power lens is moved in a direction which reduces the magnification, thereby more precisely indicating the macro photographing range.

Preferably, the movable field frame has a pivot shaft located, for example, on one side of the finder optical path, so that the field frame rotates about the pivot shaft to be brought into the operative position from the retracted position. The movable field frame is preferably biased by a spring for reversing the biasing direction, so that both the operative position and the inoperative position are stable.

According to another aspect of the present invention, assuming that the existing macro photographing mode of a conventional camera having a zoom lens is a first macro mode, the camera has a second macro mode in which at least a part of the zooming lens group is advanced beyond the first macro photographing range (first macro photographing mode) to make it possible to take a picture of an object closer to the camera than the possible object distance of the first macro mode.

To solve the problem that the photographing range can not be visually confirmed due to the increased parallax caused by the closer macro photographing (the realization of the second macro mode), according to the present invention a provision is also made for a finder which causes a slight change of magnification in association with the movements of the zoom lens group into the first macro mode and/or the second macro mode.

When the finder magnification decreases as mentioned above, the finder field of view becomes larger than the actual photographing range, and the macro photographing range can be indicated within the enlarged finder field of view.

In the case of a camera having a two-stage macro function of the first and second macro modes, in the second macro mode the movable field frame can be moved to the operative position in which the field frame is located in the optical path.

According to another aspect of the present invention, a provision is made for a field-adjusting device which can easily adjust the field of view of the finder to meet a real film plane.

The field-adjusting device in a real image type finder device having an objective optical system and an ocular optical system according to the present invention includes a reflector which is provided in the objective optical system to bend the optical path thereof. The reflector is rotatable and adjustable about a shaft which passes a reflecting surface of the reflector and is perpendicular to a plane which includes optical axes of light incident upon and reflected by the reflecting surface.

With this arrangement, when the reflector is rotated to adjust the angular position thereof, the field of view is moved toward the plane including the optical axes.

According to still another aspect of the present invention, in a cam device in a camera in which an intermediate rotating lever is superimposed between a cam plate and a movable member, the invention is aimed at precis control of the position of the movable member.

To this end, in the cam device of a camera including a reciprocable cam plate having a cam groove, an intermediate rotating lever which has a cam follower pin engaged in the cam groove and which is rotatable abut an axis, and a movable member which is moved in association with the rotation of the intermediate rotating lever, according to the present invention, the improvement comprises an auxiliary cam groove and an auxiliary cam follower pin provided in the cam plate and the intermediate rotating lever, respectively. The auxiliary cam follower pin is engaged in the auxiliary cam groove within a displacement range of the cam plate to restrict the angular displacement of the intermediate rotating lever.

The present disclosure relates to subject matter contained in Japanese Utility Model applications No. 2-13289, No. 2-13290, No. 2-13291 and No. 2-13296 (all filed on Feb. 14, 1990) which are expressly incorporated herein by reference in their entirety.

BRIEF DESCRIPTION OF THE DRAWINGS

The invention will be described below in detail with reference to the accompanying drawings, in which:

FIG. 1 is a schematic view of a lens arrangement and tracks of the movement of a zoom photographing optical system, as well as a finder optical system in a zoom lens camera having a macro photographing function, according to the present invention;

FIG. 9 is a diagram showing the relation between zoom codes and zoom positions;

FIG. 14 is a plan view of a cam plate;

FIG. 26 is a front elevational view thereof; FIG. 27 is a sectional view taken along the line X—X of FIG. 26; and FIG. 28 is a side view of FIG. 27;

FIG. 29 is a cross-sectional view of the device; and FIG. 30 is a back view of FIG. 29 seen from the arrow Y in FIG. 29.

DESCRIPTION OF THE PREFERRED EMBODIMENTS

FIG. 1 shows a lens arrangement of a zoom photographing optical system T and a finder optical system F in a zoom lens camera, and tracks of the movement thereof, by way of an example.

The photographing optical system T has three groups of lenses consisting of a first lens group A, a second lens group B and a third lens group C. The first and third lens groups A and C move together, and the second lens group B moves relative to the first and third lens groups A and C to change the spatial distance therebetween and effect the regular zooming between a telephoto extremity and a wide angle extremity. When only the second lens group B moves forwardly by one step from the telephoto extremity, the photographing mode is changed to the first macro photographing mode (range) in which the regular macro photographing can be carried out. A further forward movement of the second lens group B causes the photographing mode to be changed to the second macro photographing mode (range) in which a picture of a closer object than that in the first macro photographing range can be taken. Specifically, the magnification increases toward the telephoto extremity, in other words, in the order of the first macro range and the second macro range. The focusing is effected by the movement of the second lens group B in the optical axis direction.

The finder optical system F includes four lens groups consisting of a first lens group L1, a second lens group L2, a third lens group L3 and a fourth lens group L4, arranged in this order from the object side. The first lens group L1 and the fourth lens group L4 are stationary lenses, and the second lens group L2 and the third lens groups L3 are movable lenses which vary the power (magnification) of the finder optical system F. The second and third lens groups L2 and L3 are moved in association with the zooming operation of the photographing optical system T in the regular zooming range between the telephoto extremity and the wide angle extremity to change the field of view thereof Upon transfer to the first macro range from the telephoto extremity, the second and third lens groups L2 and L3 are moved in a direction which reduces the finder magnification, contrary to the photographing optical system T. Upon transfer to the second macro range, further movement of the second and third lens groups L2 and L3 in a direction which reduces the finder magnification takes place.

Figure 2:
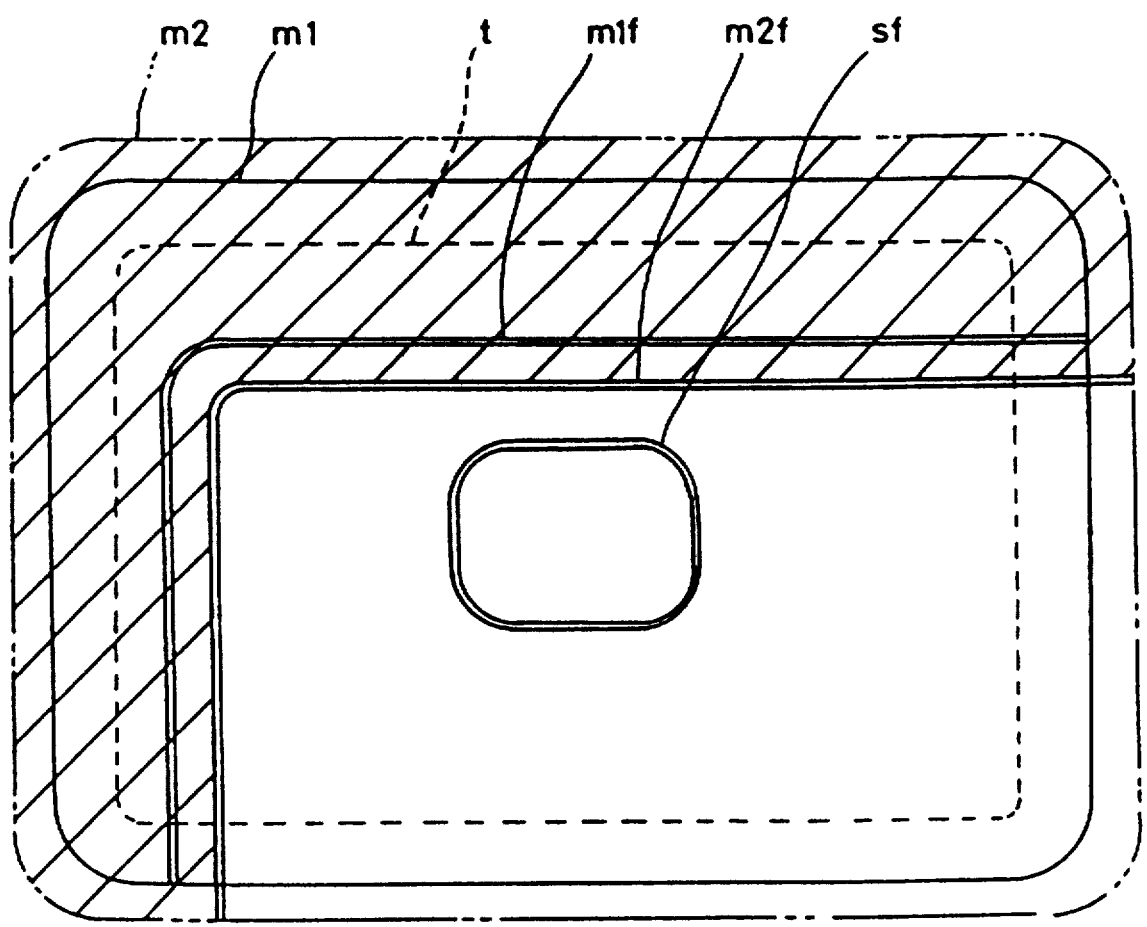
FIG. 2 is a front elevational view of a finder device showing a change of the field of view thereof.

FIG. 2 shows the field of view which can be observed through the finder and which changes in the telephoto extremity, the first macro range and the second macro range. Note that there is no mechanical change in the size of the finder itself. Supposing that the normal field of view at the telephoto extremity is designated as a dotted line t, the field of view at the first macro range is designated as a solid line m1 which is larger than the normal field of view t, and the field of view at the second macro range is designated as a two-dotted and dashed line m2 which is larger than the field of view m1. The photographing ranges by the photographing optical system T in the first macro mode and the second macro mode can be contained in the enlarged fields of view m1 and m2. A first macro frame m1f and a second macro frame m2f are provided in the finder to indicate the photographing ranges of the first macro mode and the second macro mode within the enlarged fields of view. The first and second macro frames m1f and m2f are usually designed to be slightly smaller than a real picture plane. The mark "sf" designates an object distance measuring frame which represents an object distance measuring range upon automatic focusing.

As can be understood from the above discussion, according to the present invention the photographing range is indicated by decreasing the magnification of the finder optical system F upon transfer to the macro range, and accordingly, not only does no deterioration of the image occur, but also a diopter in the macro photographing mode, in which an object closer to the camera than the reference object distance is observed, on be automatically corrected by the movement of the second and third lens groups L2 and L3.

DRIVE MECHANISM OF ZOOM PHOTOGRAPHING OPTICAL SYSTEM T

The following discussion will be directed to an embodiment of a drive mechanism of the lens groups of the zoom photographing optical system T along predetermined tracks, with reference to FIGS. 3 through 9.

Figure 3:
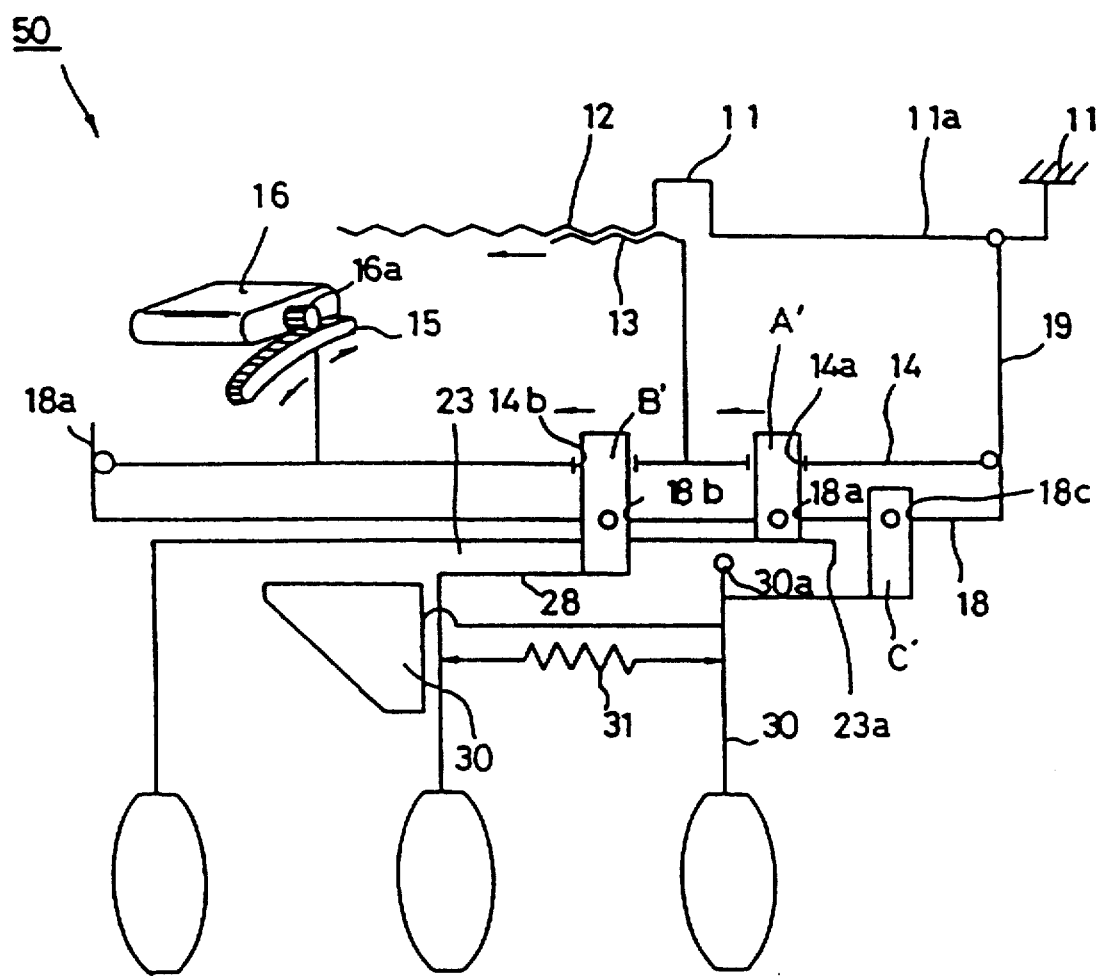
FIG. 3 is a skeleton diagram of a lens barrel which is provided thereon with the zoom photographing optical system shown in FIG. 1.
Figure 4A:
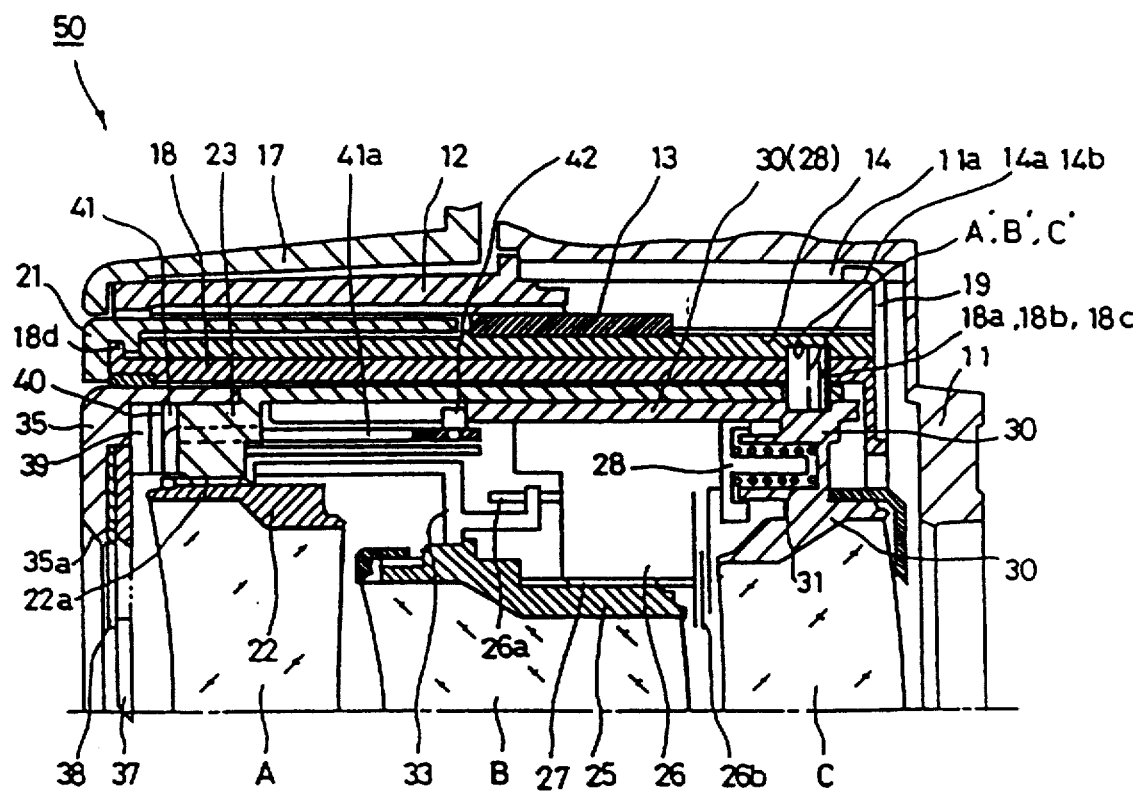
FIGS. 4A, 4B and 4C are sectional views of an upper half of a lens barrel shown in FIG. 3, shown in a retracted Position, a shortest focal length position, and a longest focal length position, respectively.
Figure 4B:
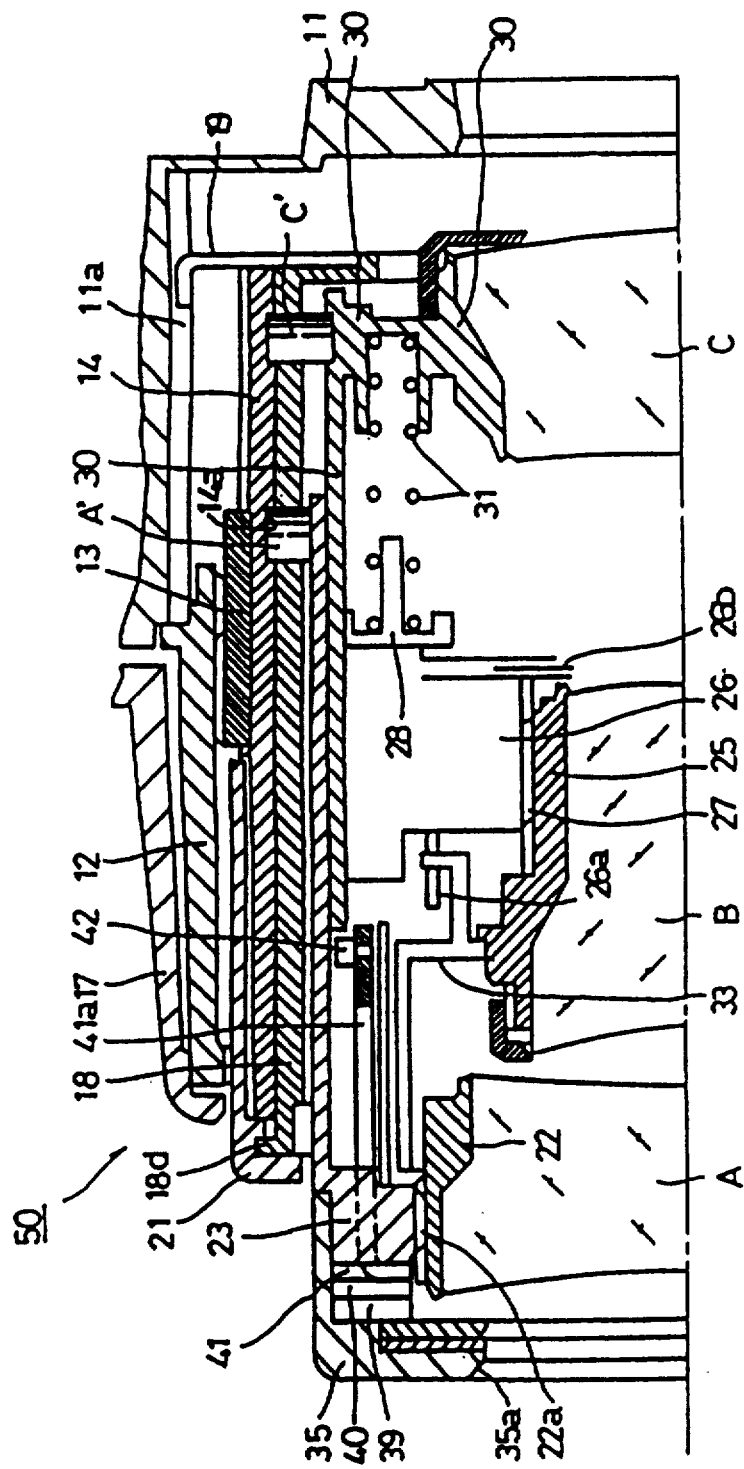
Figure 4C:
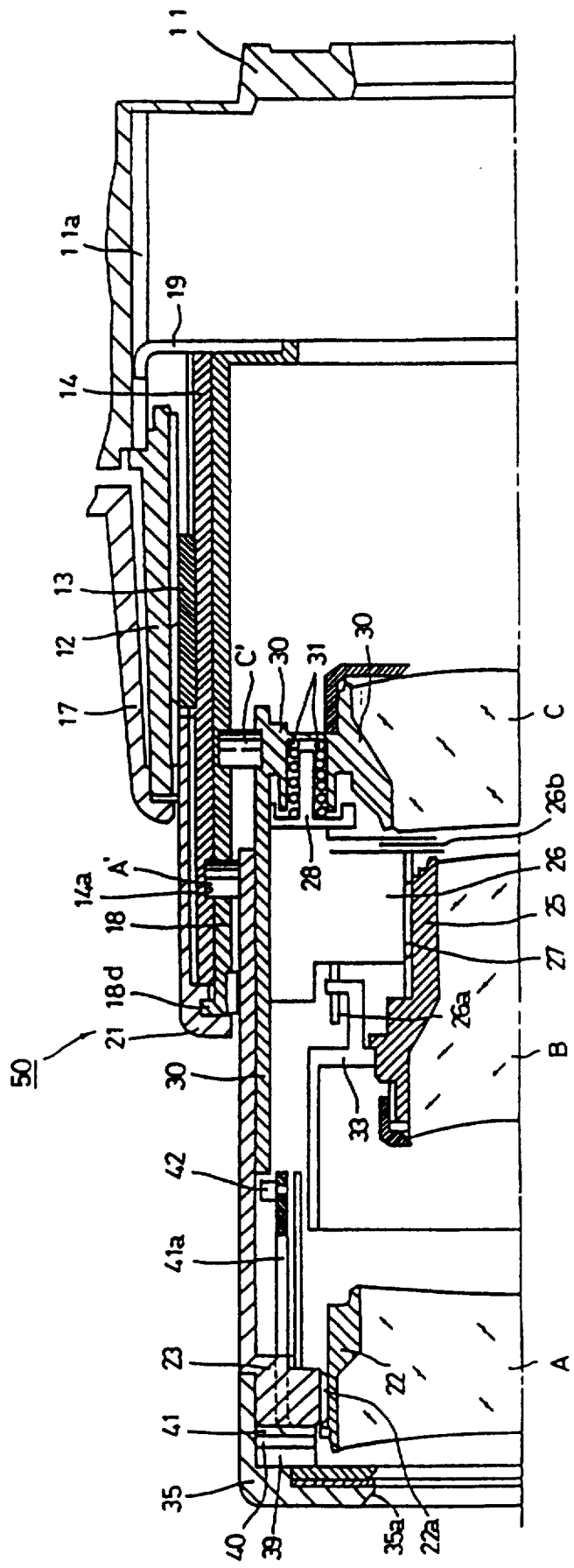

One of the most significant features of this embodiment is addressed to an arrangement of a zoom photographing optical system in which the accommodation length of the lens groups can be shortened. FIGS. 4A, 4B and 4C show a retracted position (accommodated position), a shortest focal length position (wide angle) and a longest focal length position (telephoto), respectively. FIG. 3 shows a skeleton of the main components of the zoom lens barrel 50 according to the present invention.

The basic operation of the embodiment is as follows. The first and third lens groups A and C move together within a zooming range from the wide angle extremity shown in FIG. 4B to the telephoto extremity shown in FIG. 4C, and the second lens group B varies the spatial distance relative to the first and third lens groups A and C to effect the zooming. The focusing is effected by the second lens group B. The first macro photographing mode is given when only the second lens group B is moved forwardly at the telephoto extremity shown in FIG. 4C. The photographing mode is changed to the second macro photographing mode by a further forward movement of the second lens group B, as shown in FIG. 1. In the illustrated embodiment, upon transfer to the retracted position shown in FIG. 4A in which the first, second and third lens groups A, B and C are retracted from the wide angle extremity shown in FIG. 4B, the first lens group A is disengaged from the third lens group C, so that the first and second lens groups A and B are moved to come closer to the third lens group C, thereby reducing the accommodation length of the lens groups.

A stationary ring 11 secured to the camera body is provided with an outer helicoid (inner peripheral helicoid) 12 secured to the front end thereof An inner helicoid (outer peripheral helicoid) 13 is engaged in the outer helicoid 12. A cam ring 14 is secured to the inner helicoid 13. As conceptually shown in FIG. 3, the cam ring 14 is provided with a gear 15 secured thereto, which is in mesh with a pinion 16a of a zoom motor 16. Consequently, when the zoom motor 16 is driven, the cam ring 14 is rotated and moved in the optical axis direction in accordance with the 28 lead of the inner helicoid 13. The gear 15 is preferably inclined in the same direction as the threads of the inner helicoid 13. Numeral 17 designates a front cover which surrounds the outer helicoid 12.

A linear movement ring 18 is fitted in the inner peripheral surface of the cam ring 14. The linear movement ring 18 is provided on its rear end with a linear movement guide plate 19 secured thereto, which is partially engaged at the outer peripheral surface thereof in a linear movement guide groove 11a formed in the stationary ring 11. The linear movement ring 18 is provided on its front end with an outer flange 18d, so that the cam ring 14 is rotatably held between the outer flange 18d and the linear movement guide plate 19 so as not to move in the optical axis direction. Consequently, the linear movement ring 18 is prevented from rotating by the linear movement guide plate 19 and is movable in the optical axis direction together with the cam ring 14. The cam ring 14 is rotatable relative to the linear movement ring 18. A cylindrical lens cover 21 is secured to the outer flange 18d.

A first lens frame 22 to which the first lens group A is secured is secured to a first lens moving ring 23 through an adjusting screw 22a. The first lens moving ring 23 is provided on its rear end with a first roller A' for the first lens group A. The first roller A' extends through the linear movement guide groove 18a (FIG. 3) formed in a linear movement ring 18 and is fitted in a first cam groove 14a of the cam ring 14.

A second lens frame 25, to which the second lens group B is secured, is screw-engaged by the inner helicoid 27 of a shutter unit 26. The shutter unit 26 is secured to a second lens moving ring 28 which is provided on its rear end with a second roller B' for the second lens group B. The second roller B' extends through a linear movement guide groove 18b (FIG. 3) formed in the linear movement ring 18 and is fitted in a second cam groove 14b of the cam ring 14.

A third lens frame 30 to which the third lens group C is secured is provided with a third roller C' for the third lens group C. The third roller C' is fitted in a linear movement guide groove 18c of the linear movement ring 18 but is not fitted in a cam groove, unlike the first roller A' and the second roller B'.

Figure 5:
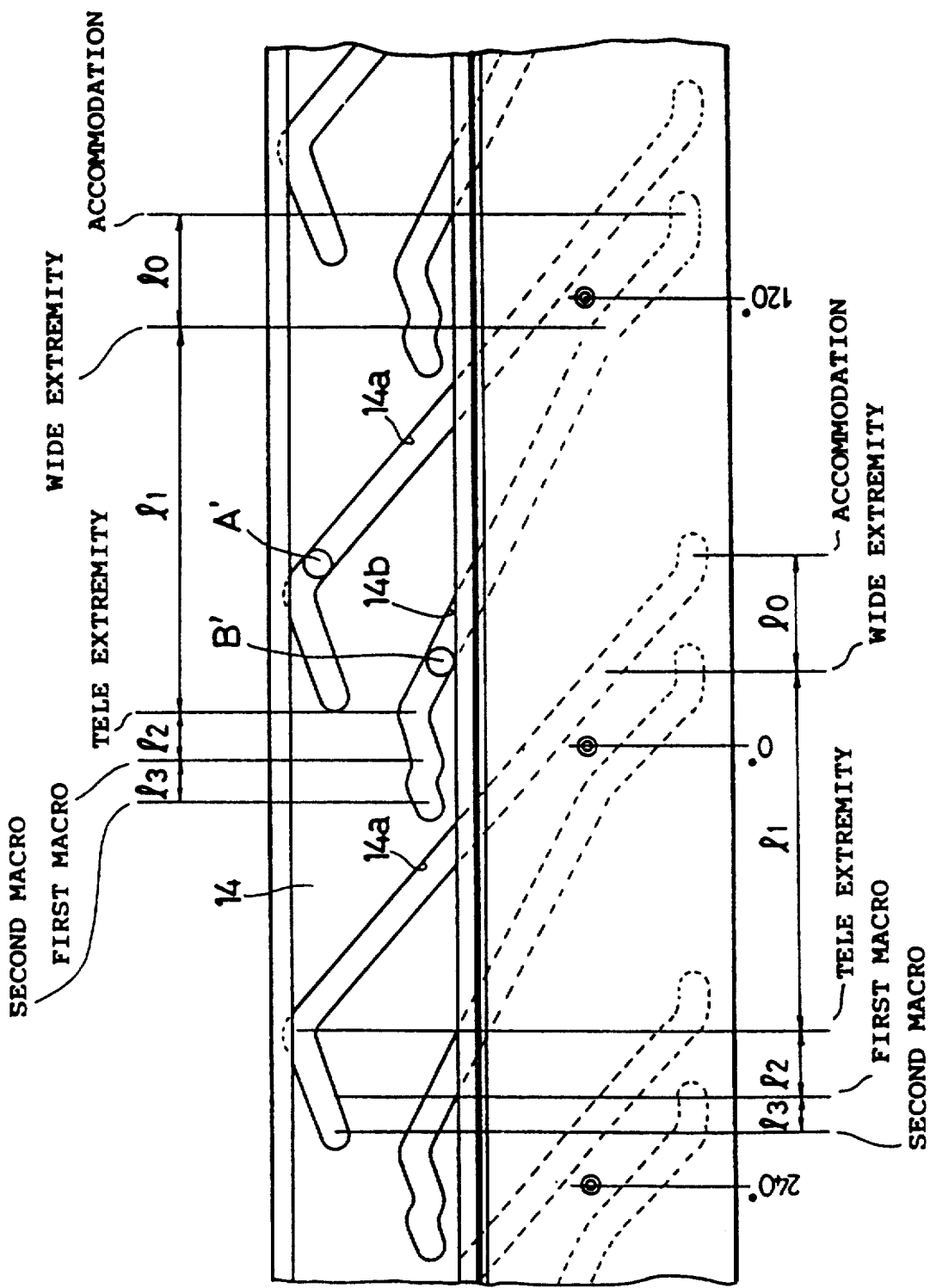
FIG. 5 is a developed view of the cam grooves of a cam ring, linear movement guide grooves of a linear movement ring, and rollers of first, second, and third lens groups.

The first cam grooves 14a and the second cam grooves 14b have accommodation sections 1 0, zoom sections 11, first macro transfer sections 12, and second macro transfer sections 13, as shown in FIG. 5. The zoom sections 11 correspond to the range shown in FIG. 1, and the accommodation sections 10 are sections in which the first, second and third lens groups A, B, and C are retracted beyond the wide angle extremity. The first macro transfer sections 12 are sections in which only the second lens group B is advanced by a slight displacement from the telephoto extremity while holding the first and third lens groups A and C at fixed positions, so that the first macro mode is obtained The second macro transfer sections 13 are sections in which only the second lens group B is advanced from the first macro mode while holding the first and third lens groups A and C at fixed positions.

The reasons that the first cam grooves 14a and the second cam grooves 14b have a slight inclination and that the inclinations of the first and second cam grooves 14a and 14b in the first and second macro transfer sections 12 and 13 are opposite to each other, are that the cam ring 14 itself is advanced by the outer helicoid 12 (inner helicoid 13). Namely, the displacement of the first lens group A (the third lens group C) and the second lens group B is determined by the resultant inclination of the lead (inclination) of the outer helicoid 12 and the inclinations of the first cam grooves 14a and the second cam grooves 14b. The inclinations of the first cam grooves 14a in the first macro transfer sections 12 and the second macro transfer sections 13 are identical to each other, so that no displacement of the first and third lens groups A and C takes place Namely, the inclination angle of the first cam grooves 14a in the first macro transfer sections 12 and the second macro transfer sections 13 is the same as that of the helicoids 12 and 13, but the directions of the inclinations are opposite to each other.

Figure 6:
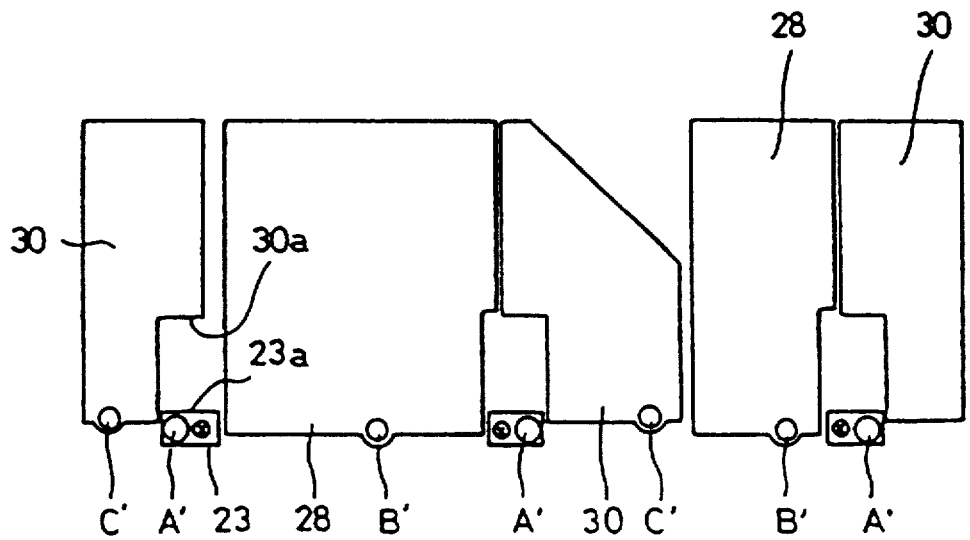
FIG. 6 is a developed view of a third lens frame and a second lens moving ring.
Figure 7:
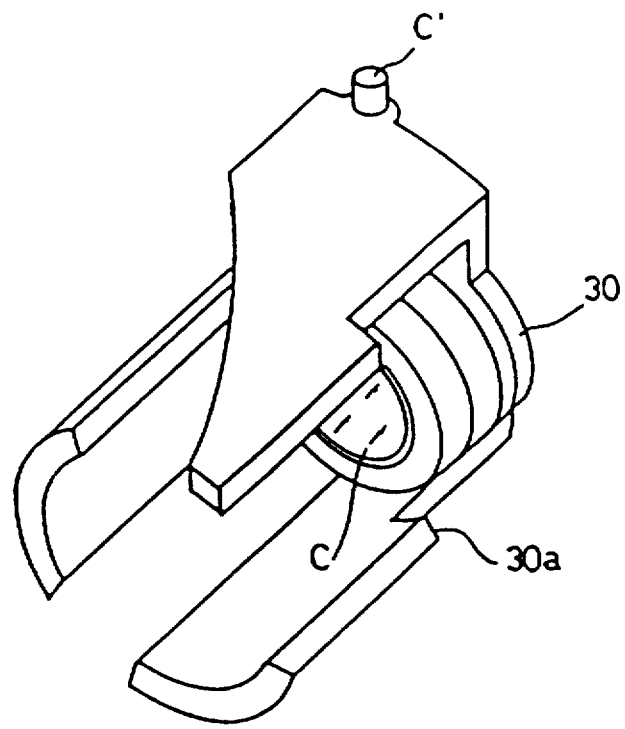
FIG. 7 is a perspective view of a third lens frame.

Between the third lens frame 30 and the first lens moving ring 23 are provided engaging portions 30a and 23a, which engage with each other during the movement of the first lens moving ring 23 from the accommodation position shown in FIG. 4A to the wide angle position shown in FIG. 4B, in accordance with the profile of the accommodation sections 10 of the first cam grooves 14a, as can be seen in FIGS. 6 and 7 Namely, when the cam ring 14 rotates, the first lens moving ring 23 moves in the optical axis direction in accordance with the relation between the first roller A' and the associated first cam groove 14a. However, when the first roller A' is between the zoom section 11 and the second macro transfer section 13 of the associated first cam groove 14a, the engaging portions 30a and 23a always engage each other. Consequently, the first lens moving ring 23 (first lens group A) and the third lens frame 30 (third lens group C) move together. Conversely, when the first roller A' enters the accommodation section 10 of the associated first cam groove 14a, the third lens frame 30 stops upon the contact of the third roller C' with the rear end of the associated linear movement guide groove 18c, and the engaging portion 23a is disengaged from the engaging portion 30a to be solely retracted. In this state, the second lens group B is retracted in accordance with the relation of the second roller B' and the associated second cam groove 14b. As a result, the first, second and third lens groups A, B, and C are wholly retracted, thus resulting in a shortened accommodation length of the lens groups FIGS. 3 and 6 correspond to FIG. 4A (accommodation position). In the photographable position shown in FIGS. 4B and 4C, the engaging portions 23a and 30a come into contact with each other.

Between the second lens moving ring 28 and the third lens frame 30 are provided a plurality of circumferentially spaced compression springs 31 which continuously bias the third lens frame 30 rearwardly, i.e., in a direction in which the engaging portion 30a tends to come into contact with the engaging portion 23a of the first lens-moving ring 23.

As is well known, the shutter unit 26 rotates a drive pin 26a by an angular displacement corresponding to the distance of an object to be taken. The drive pin 26a is operatively associated with a connecting ring 33 secured to the second lens frame 25, so that when the drive pin 26a rotates, the second lens group B is moved in the optical axis direction in accordance with the inner helicoid 27. The connecting ring 33 is secured to the second lens frame after the adjustment (focus adjustment) of the axial position of the second lens frame 25 is completed. The shutter unit 26 opens and closes the shutter blades 26b in accordance with the luminance signal of an object to be taken.

In the zoom lens barrel 50 as constructed above, when the cam ring 14 is rotated in the forward or reverse direction by the zoom motor 16, the cam ring 14 is also moved in the optical axis direction. Namely, since the cam ring 14 has the inner helicoid 13 which is engaged by the stationary outer helicoid 12, the cam ring 14 moves in the optical axis direction while rotating to thereby move the linear movement ring 18 in the optical axis direction. As a result, since the linear movement ring 18 is prevented from rotating by the linear movement guide plate 19 and the linear movement guide groove 11a, a relative movement between the cam ring 14 and the linear movement ring 18 takes place. As a result the and second lens groups A and B are moved in the optical axis direction in accordance with the cam profiles of the first and second cam grooves 14a and 14b.

The third lens group C stops before the first cam grooves 14a of the cam ring 14 cause the first lens moving ring 23 to move in the accommodation sections 10, to thereby engage the engaging portion 23a with the engaging portion 30a of the third lens frame 30, since the third roller C' abuts against the rear end of the associated linear guide groove 18c. After the engaging portions 23a and 30a engage with each other and rotate toward the zoom section 11, the third lens group C begins moving together with the first lens group A. Consequently, in the zoom section 11, the first, second, and third lens groups A, B, and C move in the optical axis direction in accordance with a predetermined relation based on the first and second cam grooves 14a and 14b to effect the zooming.

Upon transfer to the first macro transfer section 12 from the zoom section 11, the second lens group B is advanced in accordance with the second cam grooves 14b. In this movement of the second lens group B, the first and third lens groups A and C do not move in accordance with he first cam grooves 14a.

Upon transfer to the second macro transfer section 13 from the first macro transfer section 12, the second lens group B is further advanced in accordance with the second cam grooves 14b. In this transfer, no movement of the first and third lens groups A and C occurs in accordance with the first cam grooves 14a.

Conversely, upon transfer from the zoom section 11 from the accommodation section 10 the first and third lens groups A and C move together when the engaging portions 23a and 30a engage with each other.

However, when the rearward movement of the third lens group C is restricted by the linear movement guide grooves 18c, only the first lens group A is retracted to come close to the third lens group C. In this state, the second lens group B is retracted in accordance with the second cam grooves 14b to come close to the third lens group C, so that the accommodation length of the lens groups are effectively reduced, as shown in FIG. 4A.

Figure 8:
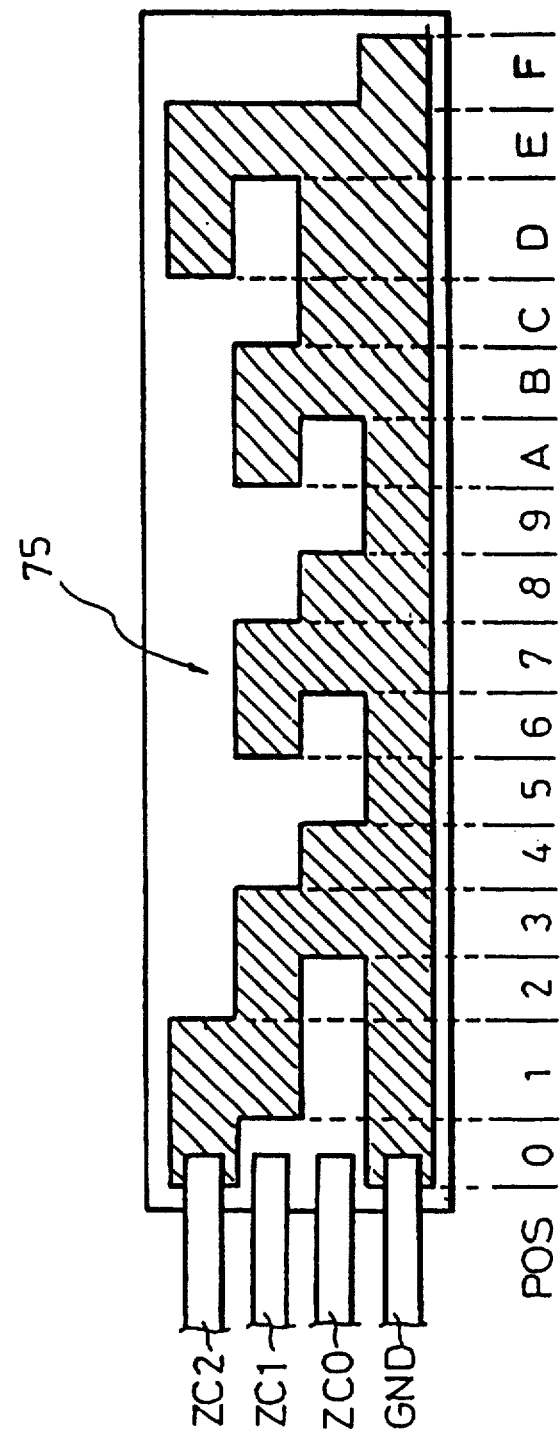
FIG. 8 is a schematic diagram of a zoom code plate and brushes, adapted to detect the focal point of a zoom lens camera according to the present invention.

FIGS. 8 and 9 show a zoom code plate 75 and brushes ZC0, ZC1, ZC2 and GND for detecting the focal length (stop position) of the zoom lens having the macro photographing function, and the detected zoom codes and POS values. The code plate 75 has 13 steps of focal lengths 38, 44, 50, 57, 65, 72, 80, 87, 95, 100, 105(mm), first macro (105 mm), and second macro (105 mm), on the supposition that the focal length of the zoom lens is 38 mm ~ 105 mm. The zoom code plate 75 is secured, for example, to the cam ring 14, extending in the circumferential direction, and the brushes are secured to the stationary ring 11 so as to come into contact with the code plate 75. POS represents the following positions: POS=0 designates the LOCK position, POS=1 the stop prohibition position, POS=2~C the above-mentioned eleven focal length positions of 38 mm ~ 105 mm. POS=D the stop prohibition position. POS=E the first macro position (105mm), and POS=F the second macro position (105mm), respectively (note that the number of steps of POS values is 16).

The zoom code ZC has relative codes in which the same codes appear at least twice from POS=2 to POS=C for the 16 steps of POS's, and has absolute codes for POS values=0, 1, D and E, as shown in FIG. 9. The zoom code ZC also has a relative code for POS=F. For instance, the zoom code ZC=4 appears at POS=3, POS=7 and POS=B, and accordingly, the POS value can be detected by counting the number of the occurrence from the absolute code position using software. It is also possible to use an absolute code system in which one POS corresponds to one zoom code.

DRIVE MECHANISM OF THE FINDER OPTICAL SYSTEM F

Figure 10:
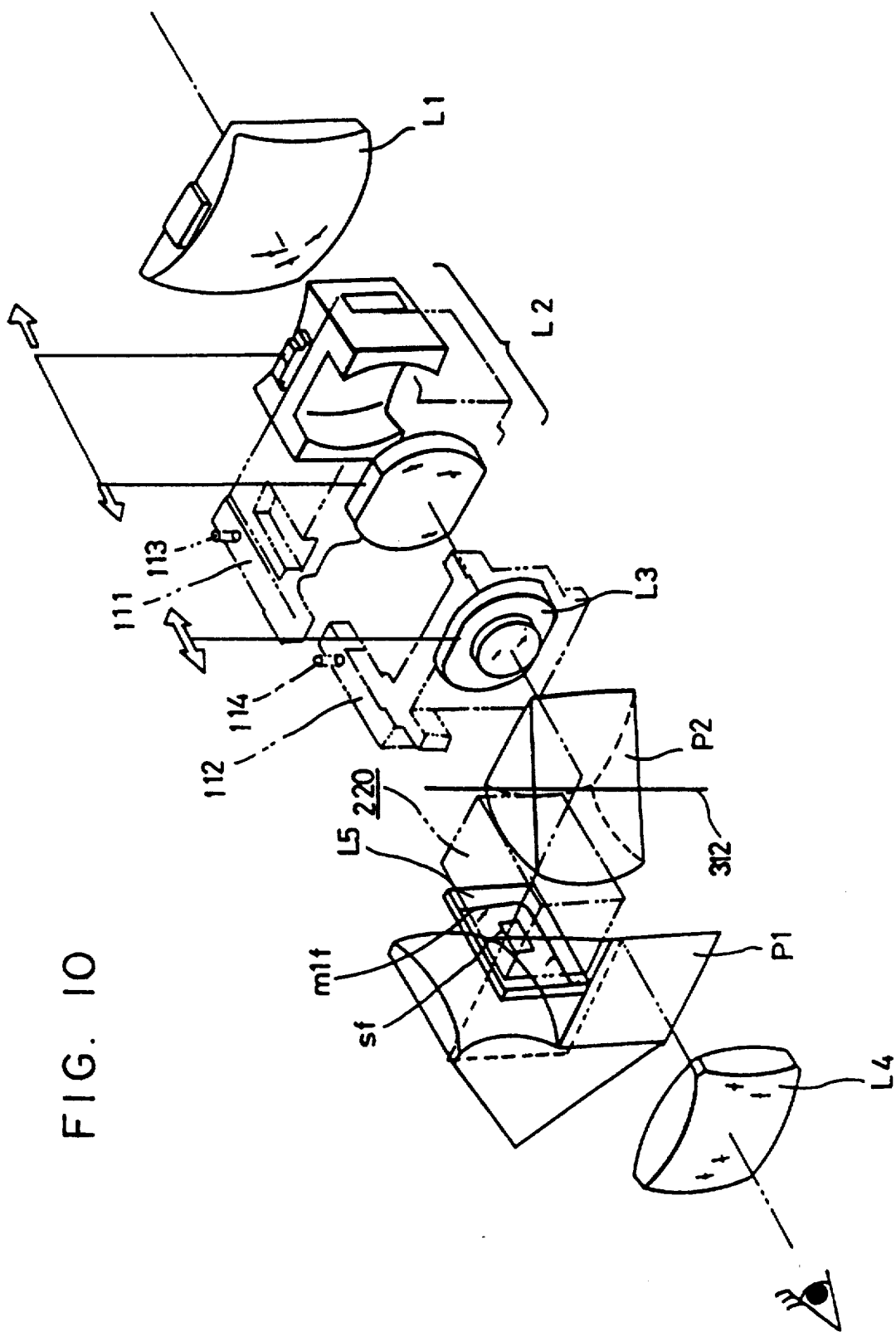
FIG. 10 is an exploded perspective view of a finder optical system according to an embodiment of the present invention.
Figure 11:
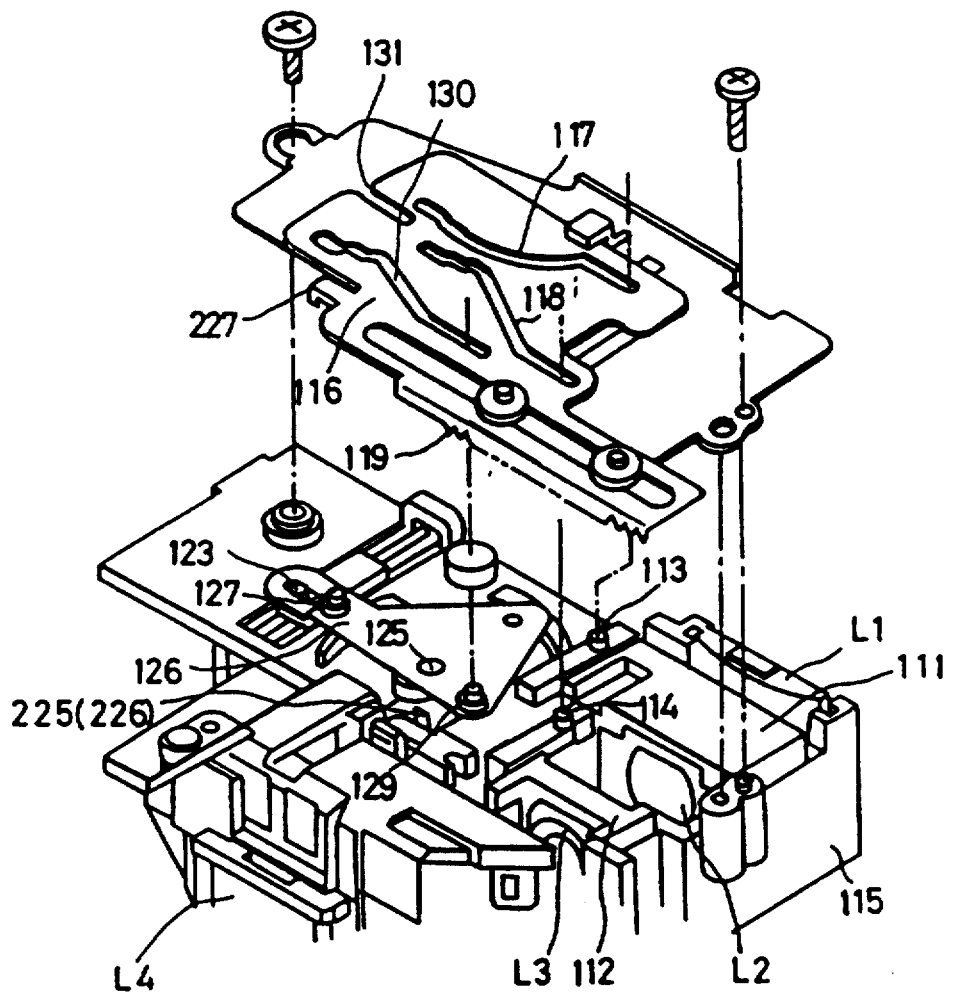
FIG. 11 is an exploded perspective view of the cam plate of a mechanism in which the finder optical system shown in FIG. 10 is incorporated.
Figure 12:
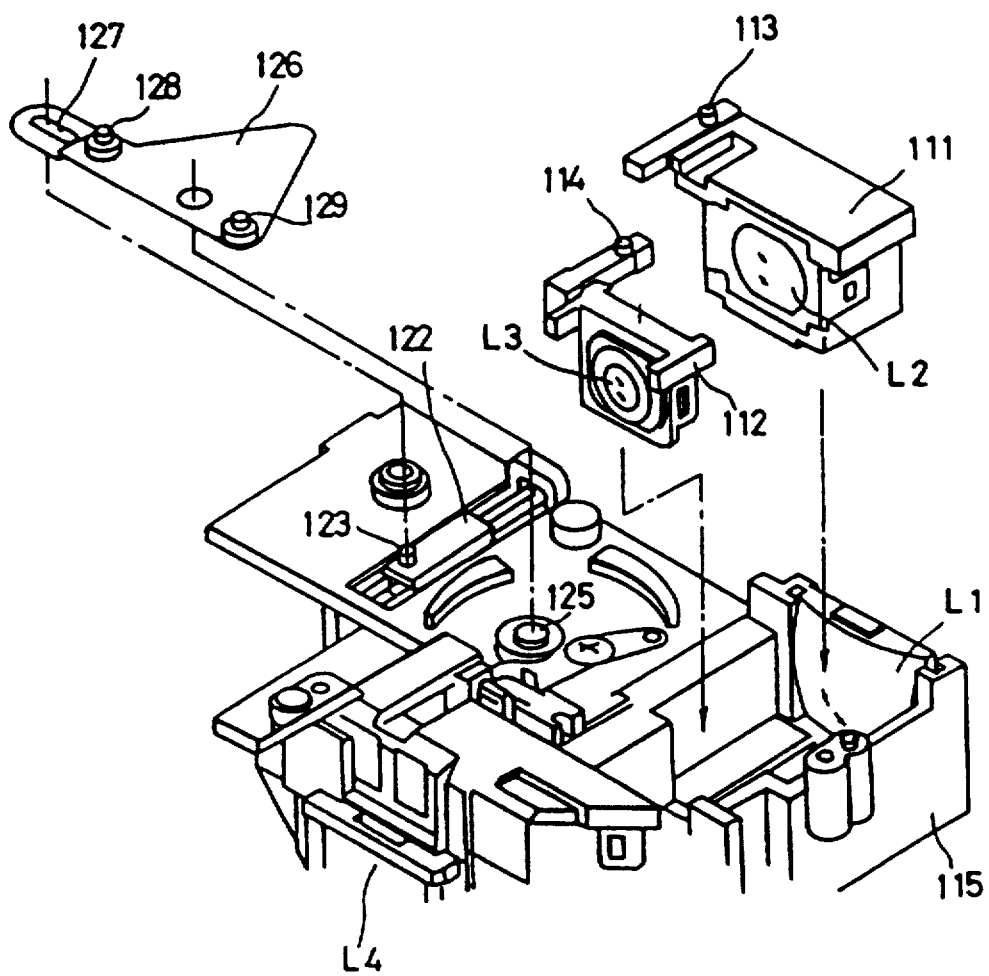
FIG. 12 is an exploded perspective view of the intermediate rotating lever and movable lens groups shown in FIG. 11 and with a removed cam plate.

The following description will be directed to the drive mechanism for moving the second and third lens groups L2 and L3 of the finder optical system F along predetermined tracks, with reference to FIGS. 10 through 12.

The arrangement shown in FIG. 10 includes a composite lens prism P1 and a lens prism P2, in addition to the finder optical system F shown in FIG. 2, to provide the necessary optical path length as a real image type finder. The second and third lens groups L2 and L3 are secured to respective movable frames 111 and 112 which are provided on the upper surfaces thereof with drive pins 113 and 114, respectively. Between the composite lens prism P1 and the lens prism P2 is provided a field glass (transparent) frame L5 on which the first macro frame m1f, the second macro frame m2f and the object distance measuring frame sf are drawn. An image of the objective optical system which is constituted by the lens groups L1, L2, L3 and the lens prism P2 is formed on the field glass frame L5, so that the image can be observed through the ocular optical system which is constituted by the composite lens prism P1 and the lens group L4.

The movable frames 111 and 112 are supported in a finder unit 115 to move in the optical axis direction. The finder unit 115 is provided on its upper portion with a laterally movable cam plate 116 in which cam grooves 117 and 118 are formed, so that the drive pins 113 and 114 are fitted, respectively. The cam plate 116 is provided on its rear end with a laterally extending rack 119 which is engaged by a pinion (not shown). The pinion is rotated in association with the zoom operation of the zoom photographing optical system T and the transfer to the macro mode to laterally move the cam plate 116.

As can be seen in FIG. 14, each of the cam grooves 117 and 118 has an accommodation section 1 0, a zoom section 1 1, a first macro transfer section 1 2 and a second macro transfer section 1 3 for moving the first and second movable frames 111 and 112 as shown in FIG. 1. The ends (boundaries) of these sections define the wide angle extremity, the telephoto extremity, the first macro and the second macro. Consequently, when the cam plate 116 is laterally moved, the second and third lens groups L2 and L3 are moved along the tracks as shown in FIG. 1. The sections 1 0 ~ 1 3 of the cam grooves of the cam plate 116 correspond to the sections 1 0 ~ 1 3 of the cam grooves of the cam ring 14 shown in FIG. 5. Consequently, the finder field of view corresponding to the focal length is obtained in the zoom sections, and the field of view is enlarged at the first and second macro photographing modes, so that the photographing range can be contained in the enlarged field of view.

Although the finder magnification is reduced both in the first and second macro photographing modes in the illustrated embodiments, it is also possible to reduce the finder magnification in only one of the first and second macro photographing modes.

Figure 25:
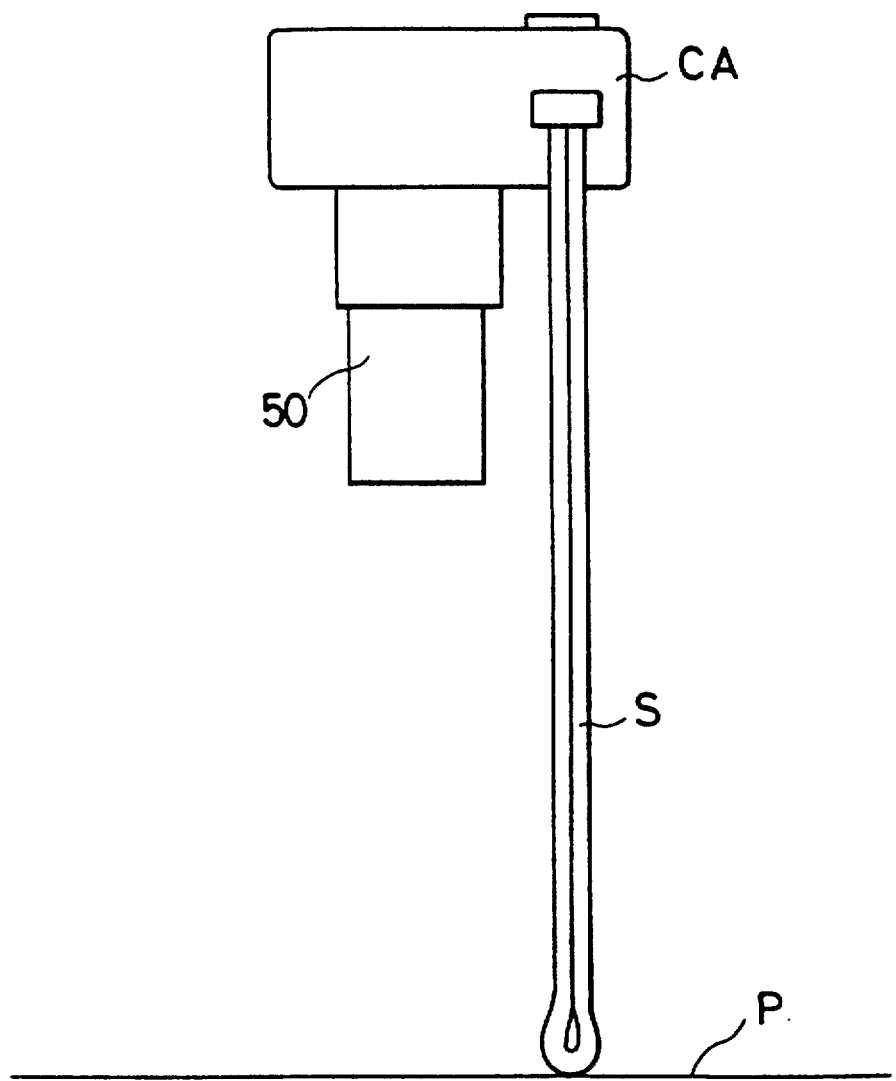

Auto focusing can be effected by the shutter unit 26 in accordance with the object distance signals at the first and second macro photographing modes. However, since the object distance is very small (it is a very close distance), particularly at the second macro mode, it is difficult to get a precise object distance signal in the second macro mode. To this end, an existing strap S provided on the camera body CA can be used as the object distance in the second macro mode. Namely, the length of the extended strap S could be an object distance corresponding to the second macro mode (see FIG. 25). In other words, in cases where an object to be taken is located at the position P defined by the length of the strap S, the second lens group B is moved to the position which is in focus on the position P.

ZOOM STROBE DEVICE (FIGS. 11~15)

Figure 15A:
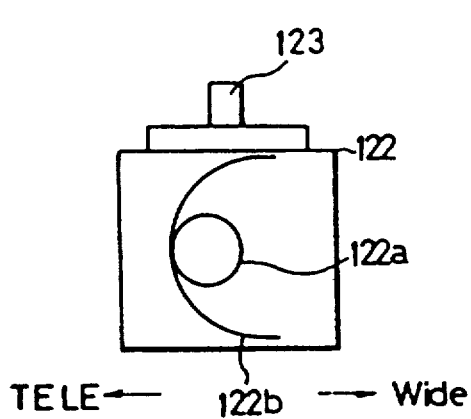
FIG. 15 is a conceptual view of a strobe device having a variable illuminating angle.
Figure 15B:
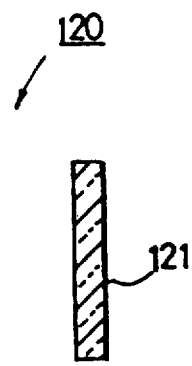

The cam plate 116 also drives a zoom strobe device (variable illuminating angle type of strobe device) 120. The zoom strobe device 120 has a fixed Fresnel lens 121 and a light-emitting block (illuminating angle varying member) 122 which is movable in the optical axis direction of the Fresnel lens 121, as conceptually shown in FIG. 15. The light-emitting block 122 includes a light-emitting tube 122a and a reflecting shade 122b integral therewith. The illuminating angle increases and decreases when the light-emitting block 122 moves forwardly and rearwardly. Accordingly, the light-emitting block 122 is moved forwardly and rearwardly when the zoom photographing optical system is moved toward the wide angle side and the telephoto side, respectively.

The light-emitting block 122 has a drive pin 123 on the upper surface thereof.

The light-emitting block 122 is supported in the finder unit 115 so as to move in the optical axis direction together with the movable frames 111 and 112 of the finder optical system, as shown in FIGS. 11 and 12.

An intermediate rotating lever 126 is pivoted to the finder unit 115 through a shaft 125. The intermediate rotating lever 126 is provided with a follower pin 129 and an elongated groove 127 on opposite sides of the shaft 125. The intermediate rotating lever 126 has an auxiliary follower pin 128 in the vicinity of the elongated groove 127 in which the drive pin 123 of the light-emitting block 122 is fitted. The distance between the axis of the shaft 125 and the auxiliary follower pin 128 is larger than the distance between the axis of the shaft 125 and the follower pin 129.

The cam plate 116 is superimposed on the intermediate rotating lever 126 so as to move laterally. The cam plate 116 has a cam groove 130 formed therein, in which the follower pin 129 is fitted. The cam plate 116 is provided on its one end with an auxiliary cam groove 131 which extends substantially in parallel with the direction of the movement of the cam plate 116.

The cam groove 130 has a zoom section 1 1, a first macro transfer section 1 2, and a second macro transfer section 1 3 similar to the cam grooves 117 and 118, as shown in FIG. 14.

The light-emitting block 122 moves in association with the movement of the cam plate 116 as described below.

Figure 13:
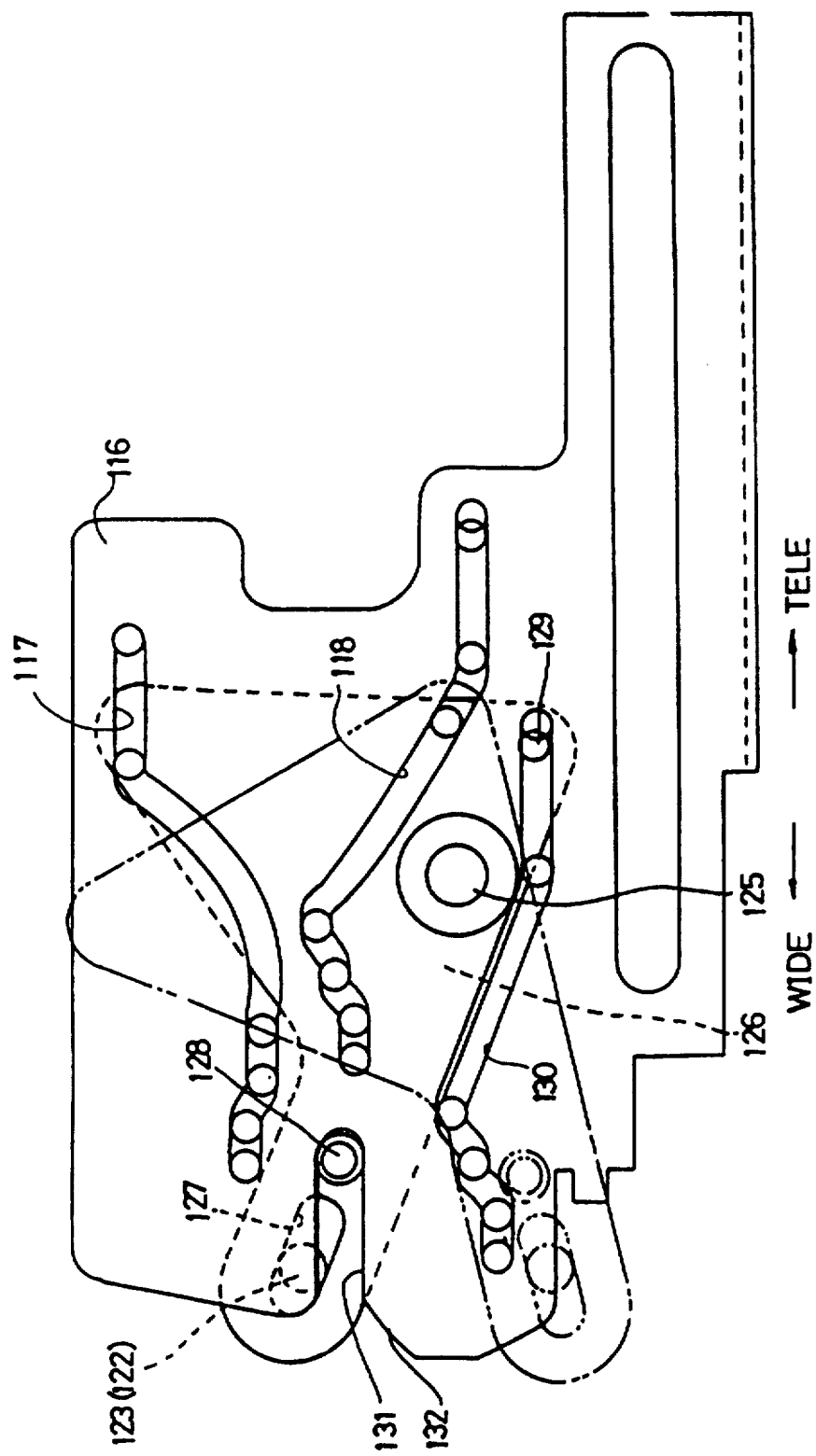
FIG. 13 is a plan view of an intermediate rotating lever and a cam plate.

Looking at the shape of the cam groove 130, in FIGS. 11 and 13, when the follower pin 129 is located at the wide angle extremity of the cam groove 130, the intermediate rotating lever 26 rotates about the shaft 125 in the clockwise direction through the largest angular displacement, so that the light-emitting block 122 is located at the frontmost position due to the engagement of the drive pin 123 in the elongated groove 127. On the other hand, when the follower pin 129 is located at the telephoto extremity of the cam groove 130, the intermediate rotating lever 126 rotates in the counterclockwise direction through the largest angular displacement, so that the light-emitting block 122 is moved to the rearmost position. The light-emitting block 122 is located in an intermediate position between the frontmost and rearmost positions when the follower pin 129 is between the wide angle extremity and the frontmost extremity.

One of the most significant features of the zoom strobe device 120 mentioned above resides in the provision of the auxiliary cam groove 131 and the auxiliary follower pin 128 fitted in the auxiliary cam groove 131 on the cam plate 116 and the intermediate rotating lever 126, respectively. According to this structure it is possible to more precisely control the position of the light-emitting block 122 at the wide angle extremity, when the intermediate rotating lever 126 is disposed between the cam plate 116 and the light-emitting block 122. Specifically, when the cam plate 116 is moved from the telephoto side to the wide angle side, the follower pin 129 enters the auxiliary cam groove 131. The auxiliary cam groove 131 has a widened portion (tapered end) 132 at the entrance thereof, so that the follower pin 129 can definitely be introduced in the auxiliary cam groove 131. Consequently, the accidental rotation (play) of the intermediate rotating lever 126 is restricted, so that the position of the light-emitting block 122 can be more precisely controlled.

In theory, if there is no clearance between the cam groove 130 and the follower pin 129, or if there is no play in the sliding movement of the cam plate 116, there is no play in the rotation of the intermediate rotating lever 126, and, accordingly, the auxiliary positioning mechanism as mentioned above can be dispensed with. However, such a clearance or a play in the sliding movement actually exists. The restriction of play in the rotation of the intermediate rotating lever 126, using the auxiliary follower pin 128 located far from the shaft 125, is easier than an attempt to minimize the clearance or the play to more accurately control the position of the light-emitting block 122.

In particular, at the wide angle extremity, when the light-emitting block 122 is moved rearwardly from a predetermined position, the emission angle is disadvantageously decreased To prevent this problem the auxiliary follower pin 128 is advantageously engaged in the auxiliary cam groove 131 at the wide angle extremity of the cam plate 116. Conversely, if the light-emitting block 122 is significantly moved forward due to the posture of the camera or the like, there is a possibility that the light-emitting block 122 comes into contact with the Fresnel lens 121. In the zoom strobe device of the present invention, the emission angle does not become small, especially at the wide angle extremity, and no collision of the light-emitting block with the Fresnel lens 121 occurs.

Although the afore-mentioned embodiments are directed to control of the movement of the light-emitting block 122 of a zoom strobe device, it is possible to apply the embodiments to a position control of the movable frames 111 and 112 if the intermediate rotating lever is used to control the movement of the movable frames.

In particular, in the cam device of a camera in which the intermediate rotating lever is interposed between the cam plate and the movable member, according to the present invention, since the auxiliary cam groove and the auxiliary follower pin are provided on the cam plate and the intermediate rotating lever, so that the auxiliary follower pin is engaged in the auxiliary cam groove within a part of the range of the displacement of the cam plate, the angular position of the intermediate rotating lever, and accordingly, the position of the movable member is precisely controlled. If the movable member to be controlled is an illuminating angle varying member of the strobe device wherein the auxiliary follower pin is engaged in the auxiliary cam groove at the wide angle extremity thereof, there is no possibility that the emission angle at the wide angle extremity could be smaller than the set value.

Figure 16:
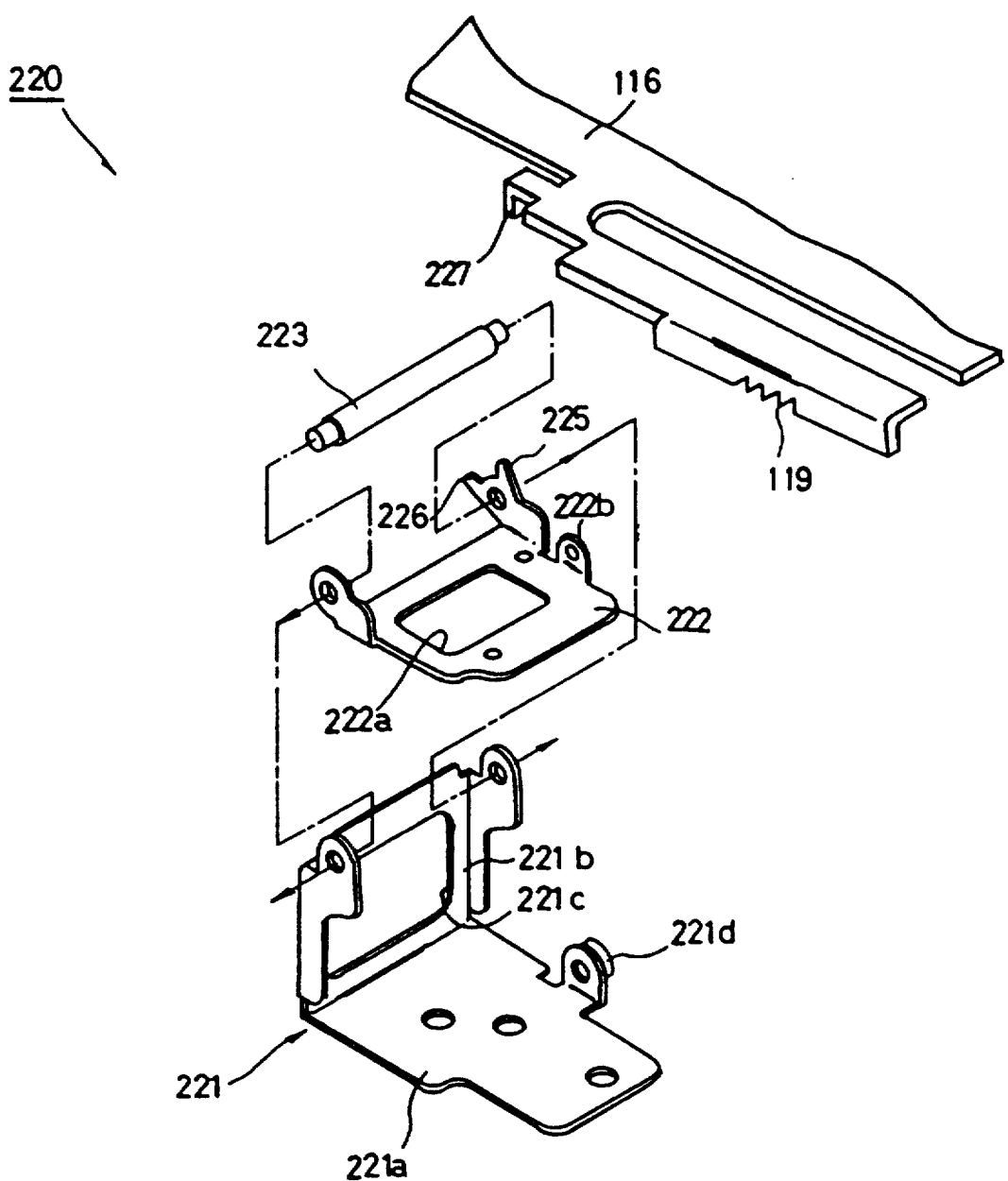
FIG. 16 is an exploded perspective view of a field restricting mechanism of the second macro mode in a finder device.
Figure 17:
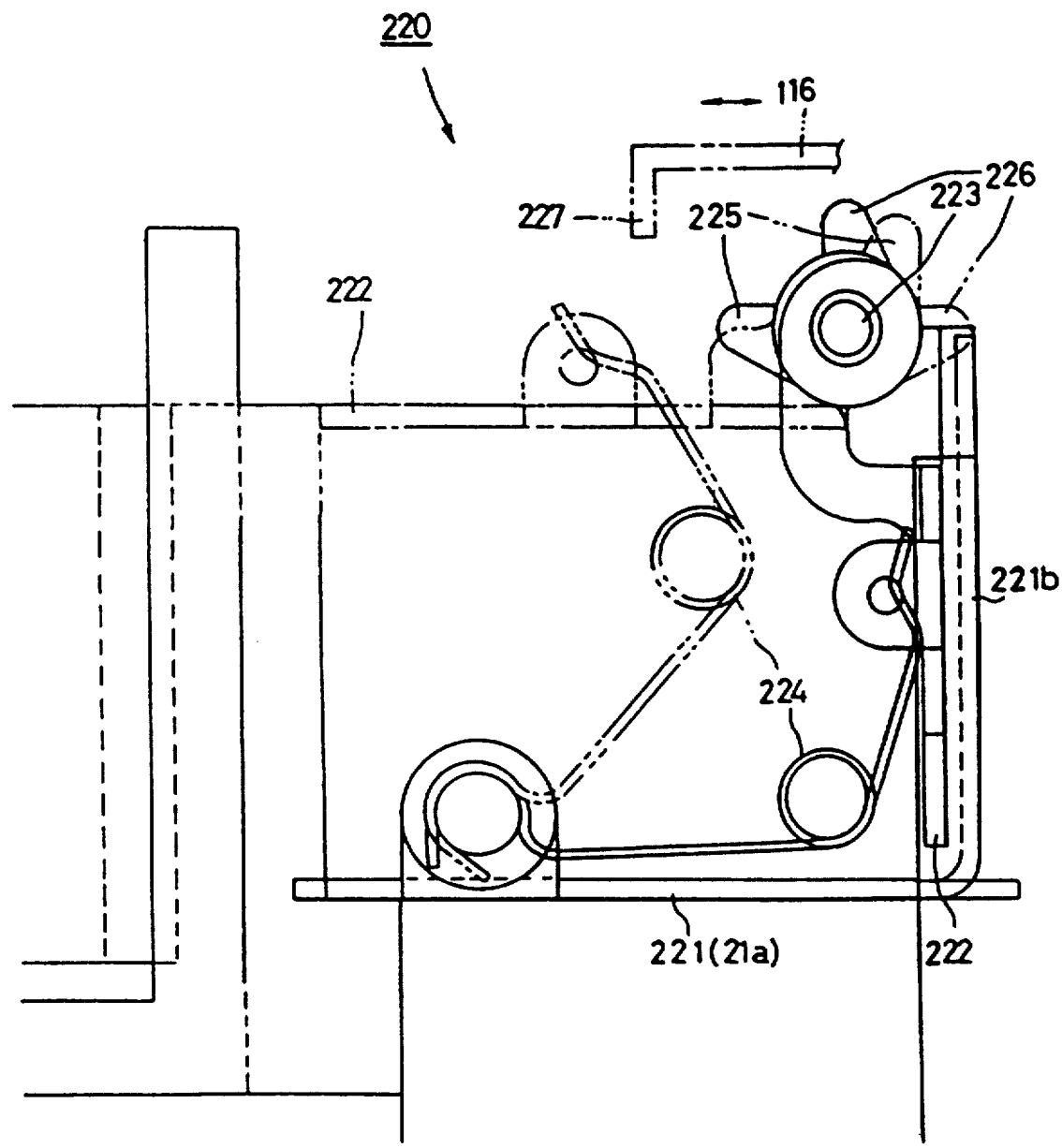
FIG. 17 is a side elevational view of an assembly of the field-restricting mechanism shown in FIG. 16.

FIELD RESTRICTING MECHANISM IN THE SECOND MACRO MODE (FIGS. 16 and 17)

As can be understood from the foregoing, in the camera of the present invention, when only the second lens group L2 is advanced by one step from the telephoto extremity of the regular zooming range, the mode is changed to the first macro mode. A further advance of the second lens group L2 changes the mode to the second macro mode. Upon transfer to the first macro mode from the telephoto extremity, the finder optical system F moves the second and third lens groups L2 and L3 in a direction which decreases finder magnification, contrary to the photographing optical system T. Upon transfer to the second macro mode, the finder optical system F moves the second and third lens groups L2 and L3 in a direction which further decreases finder magnification. The change in the field of view is shown in FIG. 2.

By the field-restricting mechanism 220 for restricting the field of view at the second macro mode, the nonphotographing area (hatched area in FIG. 2) at the macro photographing area m2f cannot be found in the finder to indicate the photographing area m2f in the second macro mode.

The field-restricting mechanism 220 is provided together with the field glass frame L5 between the composite lens prism P1 and the lens prism P2, as shown in FIG. 10.

The field-restricting mechanism 220 includes a stationary field frame 221 and a movable (rotatable) field frame 222. The stationary field frame 221 has a stationary portion 221a lying in a plane substantially parallel to the optical path and outside the optical path, and a frame portion 221b located in the optical path, and a frame to the stationary portion 221a. The frame portion 221b has a large field opening 221c formed therein. The movable field frame 222 is rotatably supported on and by a shaft 223 at the upper portion thereof, so that the movable field frame 222 rotates and occupies a retracted position (inoperative position) in which it is retracted from the optical path and an operative position in which the movable field frame 222 is located in the optical path to be normal thereto. The movable field frame 222 has a small field opening 222a formed therein which makes the finder field of view corresponding to the second macro photographing area m2f in the size and shape thereof, as shown in FIG. 2.

The movable field frame 222 is provided on its side face with a spring-engaging projection 222b, and the stationary field frame 221 is provided with a spring-engaging projection 221d on the stationary portion 221a thereof. A biasing direction reversing spring 224 (FIG. 17) is provided between the spring-engaging projections 221d and 222b to bias the movable field frame 222 in the direction of an extension of the operative position, thereby bringing it into contact with the frame portion 221b when the movable field frame 222 is in the operative position. When the movable field frame 222 is in the inoperative position (retracted position), the biasing direction reversing spring 224 biases the movable field frame 222 in the direction of an extension of the inoperative position to thereby come away from the frame portion 221b. Thus, the movable field frame 222 is stably kept in the operative position or the inoperative position by the biasing direction reversing spring 224. In other words, the operative position and the inoperative position are both stable positions. The biasing direction by the biasing direction reversing spring 224 is reversed during the movement of the movable field frame 222 between the operative position and the inoperative position.

The movable field frame 222 is provided with a first projection 225 for bringing it to the operative position and a second projection 226 for bringing it to the retracted position (inoperative position), provided in the vicinity of the shaft 223. The first projection 225 and the second projection 226 project upwardly from the finder unit 115 which receives therein the optical system shown in FIG. 10, and as shown in FIGS. 11 and 12, so that the projections 225 and 226 can be engaged by a kicking projection 227 provided on the cam plate 116 moving on the finder unit 115.

The kicking projection 227 of the cam plate 116 kicks and rotates the first projection 225 of the movable field frame 222 toward the operative position in the second macro transfer section 1 3 in which the cam plate 116 moves from the first macro mode to the second macro mode. As a result, the movable field frame 222 first rotates toward the operative position while distorting or elastically deforming the biasing direction reversing spring 224, and then comes into contact with the frame portion 221b by the spring force of the biasing direction reversing spring 224, which reverses the biasing direction thereof on the way to the operative position. In this position, the field of view of the finder is defined by the small field opening 222a corresponding to the second macro photographing area m2f which excludes the hatched area in FIG. 2. Thus, the area other than the photographing area at the second macro mode cannot be observed in the finder.

When the cam plate 116 moves from the second macro mode to the first macro mode, the kicking projection 227 kicks the second projection 226 as the same from the first macro to the second macro transfer section. As a result, the movable field frame 222 first rotates toward the retracted position while distorting or elastically deforming the biasing direction reversing spring 224, and is then moved to the retracted position by the biasing direction reversing spring 224, which reverses the biasing direction thereof on the way to the retracted position. Consequently, the finder field of view is returned to the normal state.

Although the above-mentioned embodiments are applied to a camera having a two-stage macro function (first and second macro modes), the present invention can be applied to a camera having a single stage macro function (only first macro mode) or a two-focus camera in which the optical system of the invention is used to indicate the photographing range of the longer focal point side.

According to the present invention, since the movable field frame, which is brought into the operative position in which it is disposed in the optical path at the macro photographing mode, is provided in the field-restricting mechanism 220 in a camera having a macro photographing mode, as constructed above, and since the movable field frame is provided with a field opening corresponding to the photographing range of the photographing optical system at the macro photographing mode, only the photographing area can be observed through the finder

FIELD ADJUSTING APPARATUS OF FINDER DEVICE (FIGS. 18~30)

The field adjusting apparatus according to the present invention easily adjusts the field of view to meet the real film plane.

The lens prism P1 has a flat reflecting surface 311 which bends the optical path by 90° on a horizontal plane The field-adjusting apparatus is characterized in that the lens prism P1 is rotatable and adjustable about an adjusting shaft 312 (FIG. 18) or 312' (FIG. 23), is located in the plane of the reflecting surface 311, and is normal to a plane (horizontal plane) which includes front and rear optical axes 0 (upstream side of the reflecting surface) and O' (downstream side) of light reflected by the reflecting surface 311. The adjusting shaft 312 satisfies the above-mentioned requirements and passes through the intersecting point of the optical axes O and O', and the adjusting shaft 312' is deviated from the intersecting point of the optical axes O and O'.

Figure 18:
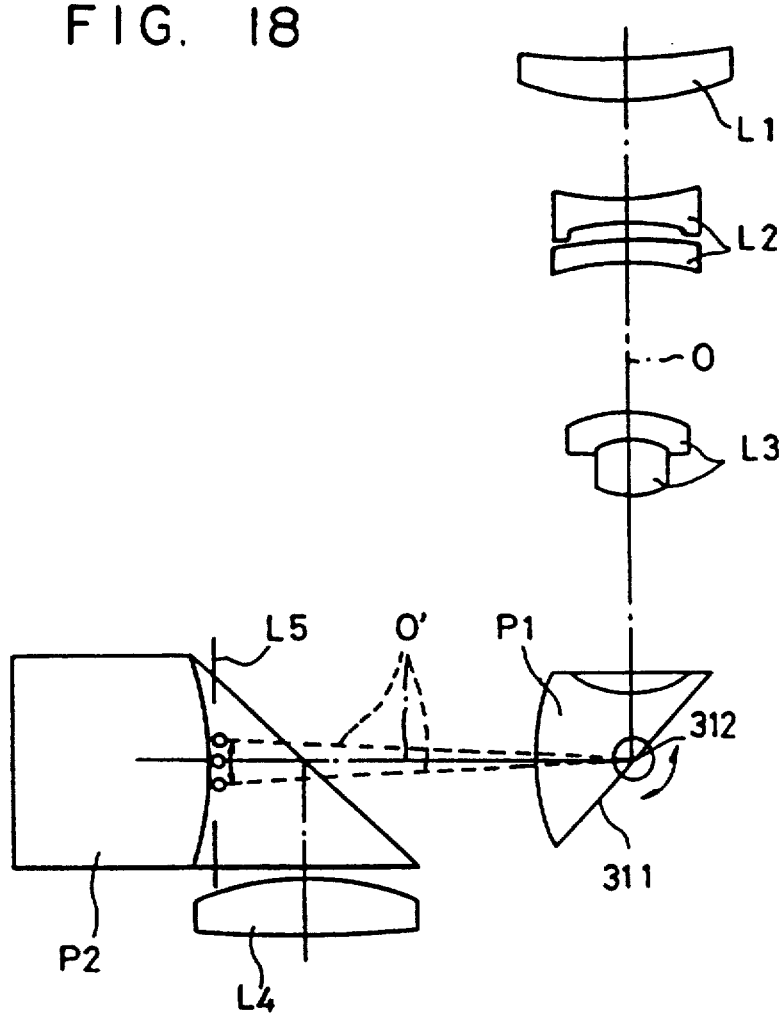
FIG. 18 is a plan view of the arrangement in FIG. 10 showing a field-adjusting device in a finder device.
Figure 23:
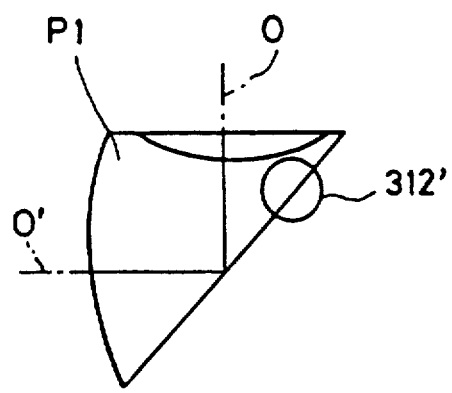
FIGS. 23 and 24 are plan views of different embodiments of a field adjusting device; and, FIG. 25 is a side elevational view for showing the photographing state of a second macro mode.

When the lens prism P1 is rotated about the adjusting shaft 312, the direction (optical axis O') of the light reflected by the reflecting surface 311 changes in the horizontal plane, as shown at imaginary lines in FIG. 18. Consequently, the finder field can be adjusted to meet the real film plane (photographing plane) by swinging the field of view in the horizontal plane In particular, when the lens prism P1 is rotatable and adjustable about the shaft 312 which passes the intersecting point of the optical axes O and O', there is little change in the optical path length due to the rotation of the reflecting surface, thus resulting in no change of the optical characteristics. However, as can be seen in FIG. 23, it is possible to rotate the prism P1 about the adjusting shaft 312', which satisfies the above-mentioned requirements and does not pass the intersecting point of the optical axes O, and O' to expect the same technical effect.

Figure 19:
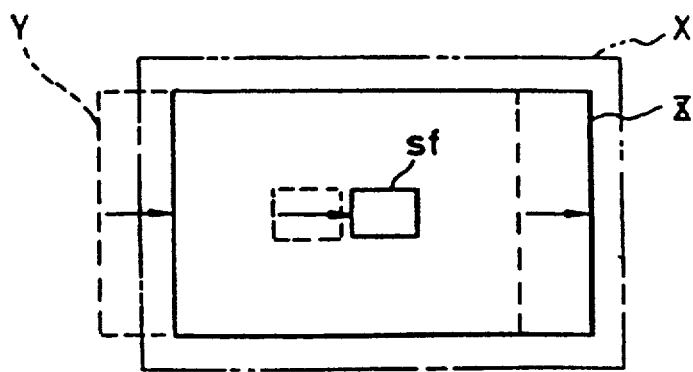
FIG. 19 is a front elevational view of a field-adjusting device for showing how to adjust the field of view.

In an arrangement shown in FIG. 19 in which the prism P1 rotates about the adjusting shaft 312, the range of the real film plane is represented by a double-dotted and dashed line X, and the field of view before adjustment is represented by a dotted line Y, the field of view can be adjusted, as designated by a solid line Z to correspond to the range X of the real film plane by the rotation of the lens prism P1 about the adjusting shaft 312. For instance, the adjustment is effected so that the measuring frame sf is located at the center of the field of view. The measuring frame which is used as a reference sign upon adjustment can be replaced with another frame (mark or sign).

Figure 20:
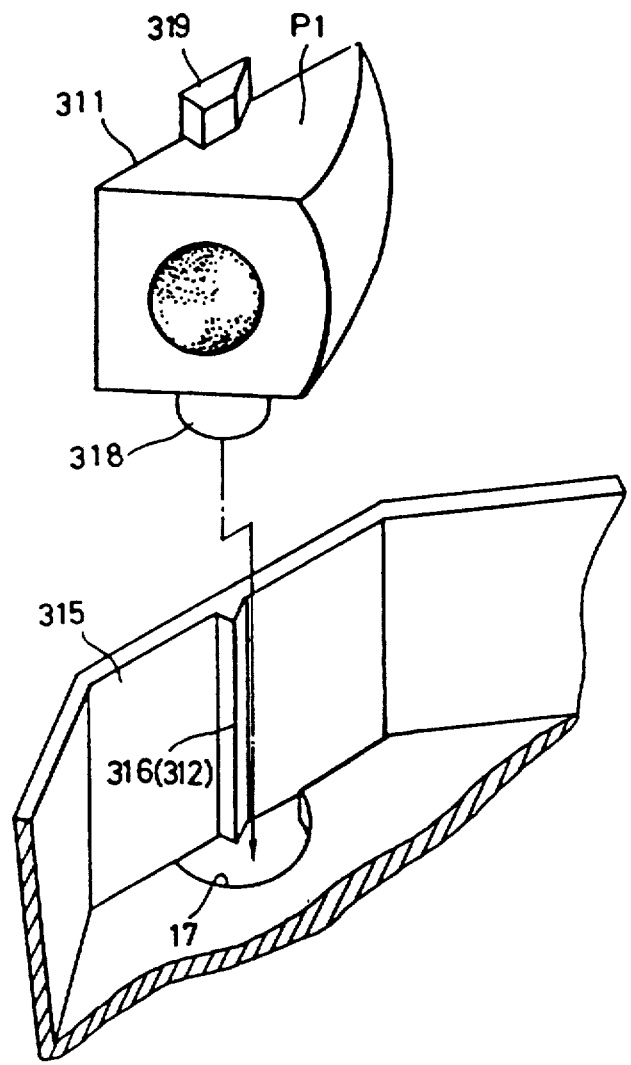
FIG. 20 is an exploded perspective view of the main components of a field-adjusting device.
Figure 21:
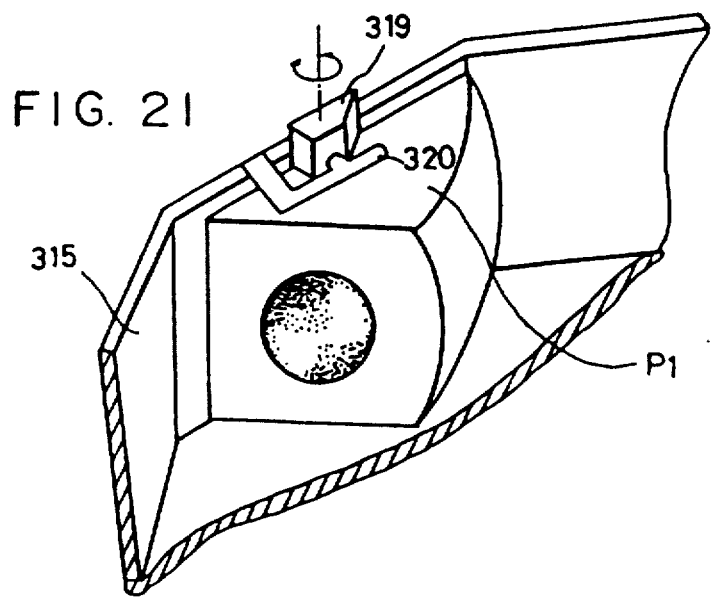
FIG. 21 is a perspective view of a field-adjusting device when assembled.
Figure 22:
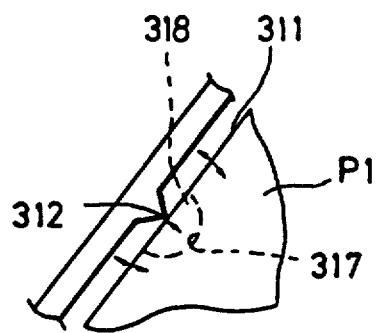
FIG. 22 is a plan view of the field-adjusting device shown in FIG. 21.

FIGS. 20, 21, and 22 show an embodiment of the rotating adjustment of the lens prism P1. A casing 315 in which the lens prism P1 is accommodated has a knife edge 316 which constitutes the adjusting shaft 312, and a semi-circular recess 317 having a center on the axis of the adjusting shaft 312, provided below the knife edge 316.

The lens prism P1 is provided, on the portion thereof below the reflecting surface 311, with a semi-circular rod 318 (i.e. a rod having a semi-circular cross section) corresponding to the semi-circular recess 317, so that the semi-circular rod 318 is snugly and rotatably fitted in the semi-circular recess 317. Consequently, when the semi-circular rod 318 rotates in the semi-circular recess 317, the lens prism P1 rotates about the adjusting shaft 312. The lens prism P1 is provided, on its end far from the semi-circular rod 318, with a spring abutting projection 319 which is engaged by a friction spring 320 secured to the casing 315 to prevent accidental rotation of the lens prism P1.

With this arrangement, the lens prism P1 can definitely be rotated about the knife edge 316 (adjusting shaft 312) to adjust the field of view. After adjustment, the lens prism P1 is adhered to the casing 315, for example, by an adhesive.

Figure 24:
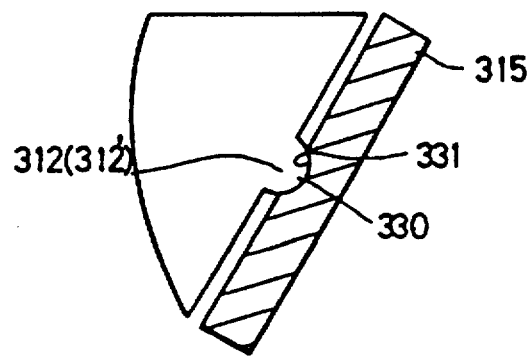

In the above-mentioned embodiment, the lens P1 is rotatable about the vertical adjusting shaft 312 (FIG. 23) or 312' passing the reflecting surface 311. In an alternative, (FIG. 24) the lens prism P1 is provided with a cylindrical projection 330 (or hole) having a center located on the axis of the adjusting shaft 312 or 312', and the casing 315 is provided with a cylindrical hole (or projection) in which the cylindrical projection 330 of the lens prism P1 is relatively and rotatably fitted, without the knife edge 316. In this alternative, the lens prism P1 can be also supported to rotate about the adjusting shaft 312 or 312'.

Although the direction of the adjustment of the field of view is horizontal in the afore-mentioned embodiments, it is possible to adjust the field of view in the vertical direction if the optical components are arranged, so that the optical axes O and O' on the upstream side and the downstream side of the reflecting member are in the vertical plane.

Although the prism P1 is used as a rotatable reflecting member in the illustrated embodiments, it is possible to provide a rotatable mirror instead of the prism P1.

Furthermore, although the illustrated embodiments of the present invention are directed to a zoom finder, the present invention can also be applied to a non-zoom finder.

FIGS. 26 through 30 indicate two other embodiments of the field-adjusting apparatus of the present invention.

Figure 26:
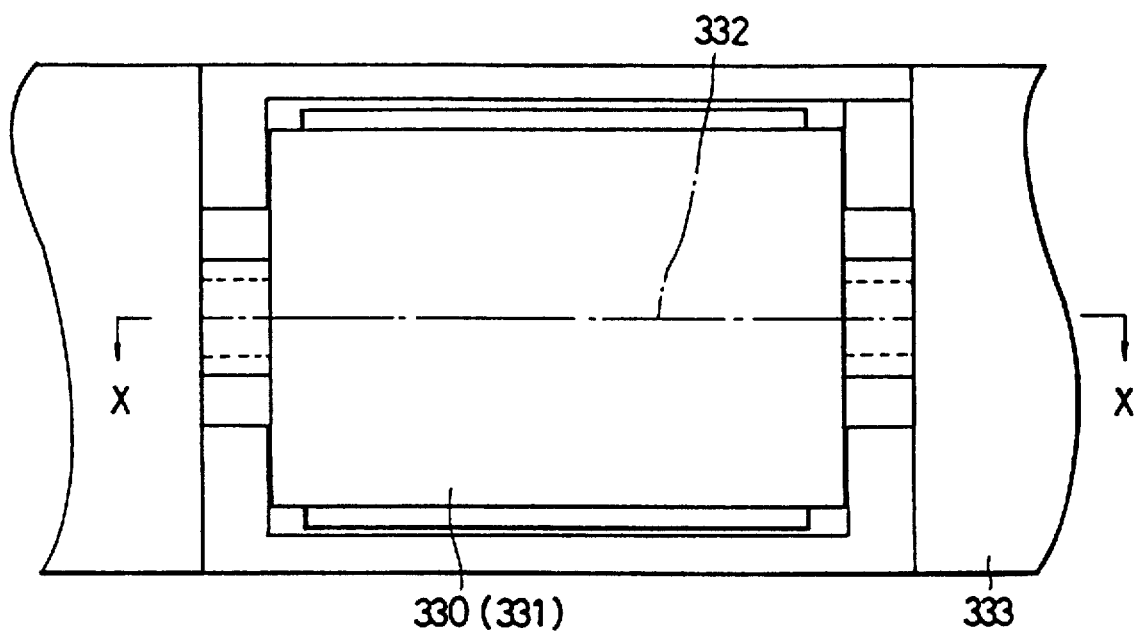
FIGS. 26 through 28 show another embodiment of the field-adjusting apparatus according to the present invention.
Figure 27:
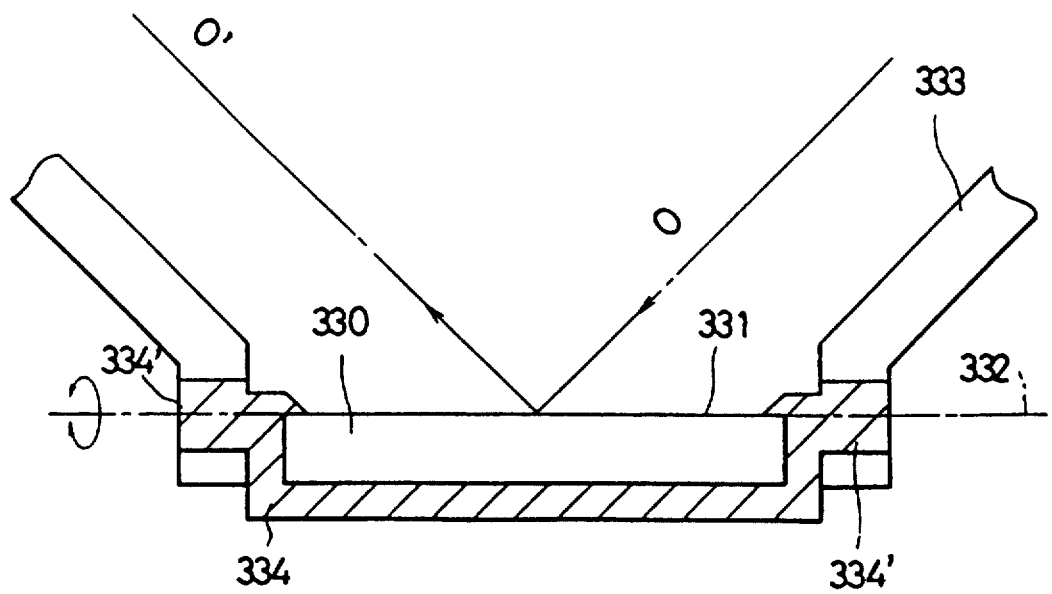
Figure 28:
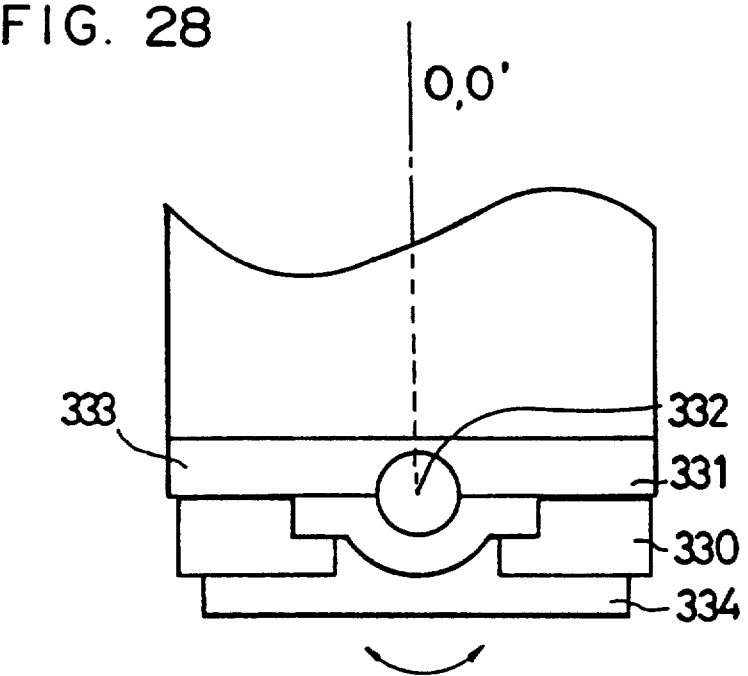

In the embodiment shown in FIGS. 26 through 28, the prism P1 is replaced by a mirror 330. The mirror 330 is rotatable and adjustable about a horizontal adjusting shaft 332, which is located on a reflecting surface 331, and located in a horizontal plane including front and rear optical axes O and O'. The mirror 330 is supported by a mirror holder 334 whose adjusting shaft portion 334, located on both ends of the mirror holder 334, is rotatably supported by a casing 333. Accordingly, by rotating the adjusting shaft portion 334', the finder field can be adjusted in an up and/or down direction.

Figure 30:
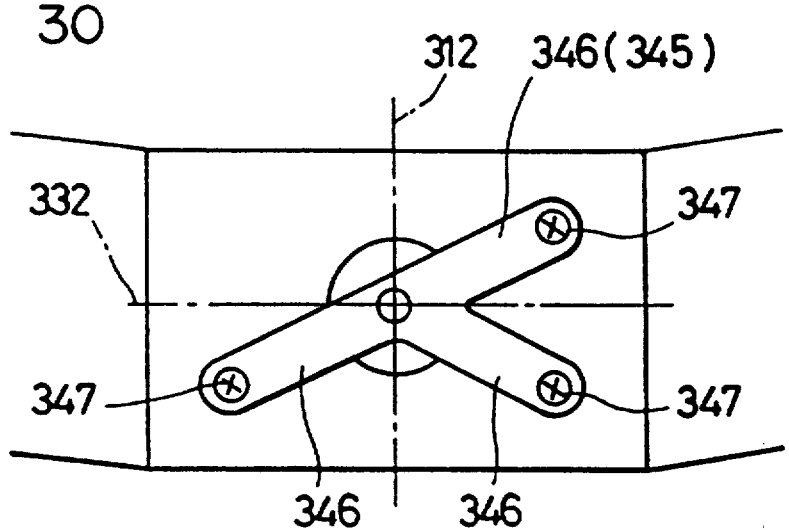
FIGS. 29 and 30 show still another embodiment of the field-adjusting apparatus according to the present invention.
Figure 29:
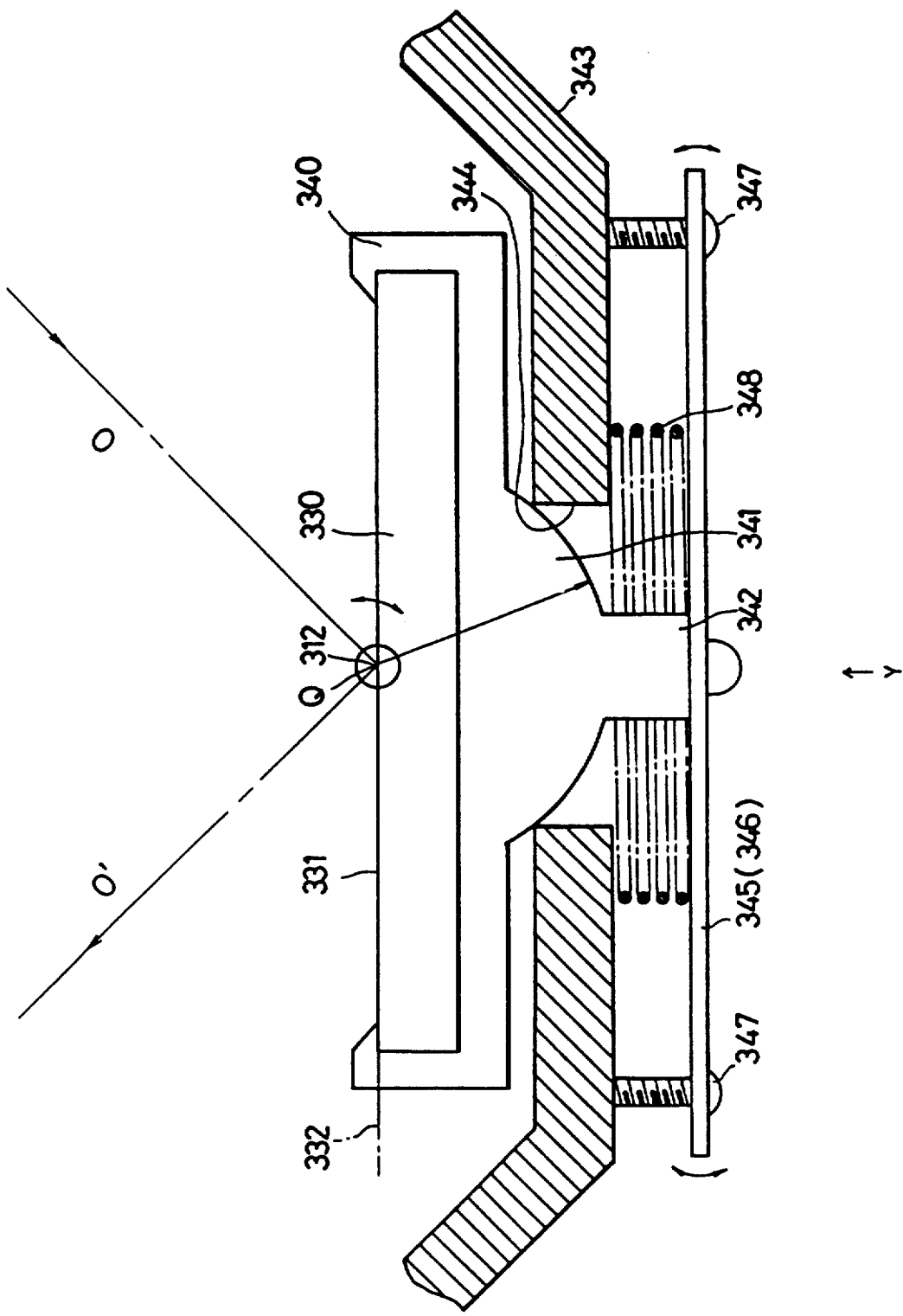

In the second embodiment shown in FIGS. 29 and 30, the finder field can be adjusted in both horizontal and vertical directions. The mirror 330 which replaces the prism P1 is supported in a mirror holder 340 having a semi-spherical portion whose center is the crossing point Q of the (vertical) adjusting shaft 312 and the horizontal adjusting shaft 332 supported by a mirror holder 340. In the semi-spherical portion, a semi-circular rod 342 is integrally provided. The semi-spherical portion 341 protrudes from a spherical hole 344, and an outer end of the semi-circular rod 342 is secured to the center of a tripod-adjusting plate 345. The tripod-adjusting plate 345 is comprised of three adjusting legs 346. Each tip of the leg 346 is secured to the casing 343 by an adjusting screw 347. And, between the casing 343 and the tripod-adjusting plate 345, a compression spring 348 is provided to draw the semi-spherical portion 341 to the end of the spherical hole 344. According to the second embodiment, by adjusting the engaging length of the adjusting screws 347, and by moving the adjusting legs 346 in the front and rear directions, the semi-spherical portion 341 rotates while it keeps coming into contact with the spherical hole 344. Since the direction of rotation is adjusted by the three adjusting screws 347, the adjustment about the vertical adjusting shaft 312, and adjustment about the horizontal adjusting shaft 332 can be performed. In other words, the field frame is adjusted in both the horizontal and vertical directions.

As can be understood from the foregoing, according to the present invention, a field-adjusting device in a real image type of finder includes a reflecting member which is provided in the objective optical system to bend the optical path thereof and which is rotatable about a shaft substantially normal to a plane including optical axes of light incident upon and reflected by the reflecting member and passing the reflecting surface of the reflecting member, whereby the field position can be easily adjusted in the direction of a plane including the optical axes. If the adjusting shaft passes the intersecting point of the optical axes of light incident upon and reflected by the reflecting member, no or little change in an optical path length occurs due to the adjustment.

We claim:

1. A camera including a finder optical system and a photographing optical system separate from the finder optical system, and having a macro photographing mode, said camera comprising:
   a movable field frame which is normally located at an inoperative position in which said movable field frame is retracted from an optical path of said finder optical system and which is moved to an operative position in which said movable field frame is int he finder optical path in association with the transfer to the macro photographing mode;
   said finder optical system comprises a variable power lens group for varying the magnification of said finder optical system, said variable power lens group being moved in a direction which reduces the magnification upon transfer to the macro photographing mode; and,
   said movable field frame being provided with a field opening corresponding to a photographing range of said photographing optical system.

2. A camera according to claim 1, wherein said movable field frame has a pivot shaft located on one side of the finder optical axis to rotate about said pivot shaft to thereby move between said operative position and said inoperative position.

3. A camera according to claim 2, further comprising a biasing direction reversing spring for biasing said movable field frame into said operative position and said integrative position, so that said operative and inoperative pistons are stable.

4. A camera according to claim 1, wherein said photographing optical system comprises a zoom lens.

5. A camera having a macro photographing mode, comprising a movable field frame which is movable between an inoperative position in which said movable field frame is retracted from a finder optical path and an operative position in which said movable field frame is in the finder optical path, said movable field frame being provided with a field opening which defines a finder field of view smaller than that when said movable field frame is in said inoperative position, said camera comprising a photographing optical system having a zoom lens and wherein said macro photographing mode comprises a first macro photographing mode in which the zoom lens is at least partially advanced beyond one of two focal length extremities of a zooming range of the zoom lens to take a picture of an object at a closer object distance than an object distance at which an object can be taken in the zooming range, and a second macro photographing mode in which the zoom lens is at least partially further advanced from an axial position corresponding to the first macro photographing mode to take a picture of an object at a closer object distance than the object distance at which a picture can be taken in the first macro photographing mode.

6. A camera according to claim 5, further comprising a zoom finder separate from the zoom lens to vary the field of view of the finder in accordance with the focal length of the zoom lens.

7. A camera according to claim 6, wherein said zoom finder decreases the magnification thereof in association with the movement of the zoom lens into said first macro photographing mode or said second macro photographing mode.

8. A camera according to claim 7, wherein an object distance in a focus condition at said second macro photographing mode is fixed.

9. A camera according to claim 7, further comprising a camera body provided with a predetermined length of strap, so that the fixed object distance corresponds to by said length of the strap.

10. A camera according to claim 9, wherein said movable field frame is provided with a macro photographing mode in which said movable field frame is moved to said operative position upon transfer to said second macro photographing mode.

11. A camera according to claim 10, further comprising a zoom strobe device which varies a strobe illuminating angle in accordance with the focal length of the zoom lens.

12. A camera according to claim 11, wherein said zoom strobe device comprises an illuminating angle varying member which moves in the optical axis direction to vary the illuminating angle.

13. A camera according to claim 12, wherein said zoom strobe device comprises a cam plate which is reciprocally moved and which has cam grooves, and an intermediate rotating lever which has cam follower pins engaged in the associated cam grooves and which is rotatable about a shaft, said illuminating angle varying member being moved in association with said rotation of said intermediate rotating lever.

14. A camera according to claim 13, wherein said cam plate and said intermediate rotating lever are provided with an auxiliary cam groove and an auxiliary follower pin which can be engaged in said auxiliary cam groove during the movement of said plate to restrict the angular displacement of said intermediate rotating lever.

15. A camera according to claim 14, wherein said auxiliary cam groove and said auxiliary follower pin engage with each other, when said illuminating angle varying member is located at a wide angle extremity to increase the illuminating angle.

16. A camera according to claim 1, wherein said finder optical system comprises a real image type of finder in which a real image formed by said objective optical system can be observed through an eye piece optical system.

17. A camera according to claim 16, further comprising a reflecting member with a reflecting surface which is provided in said objective optical system to bend an optical path of light incident thereon by reflection.

18. A camera according to claim 17, wherein said reflecting member is rotatable about a shaft existing in the reflecting surface and substantially normal to a plane which includes optical axes of light incident upon and reflected by the reflecting surface.

19. A camera according to claim 18, wherein said plane is a horizontal plane.

20. A camera according to claim 18, wherein said plane is a vertical plane.

21. A camera according to claim 18, further comprising a mark which is provided at an image-forming position in which the real image is formed by said photographing optical system to indicate a sign for the adjustment of the field of view.

22. A camera according to claim 21, wherein said mark is a measuring frame which indicates a measuring range of an object distance which can be detected by an object distance measuring device.

23. A camera according to claim 18, wherein said reflecting member is further rotatable about a second shaft existing in the reflecting surface and substantially normal to said shaft.

24. A camera with a zoom lens having a macro photographing mode comprising:
   a first macro photographing mode in which the zoom lens is at least partially advanced beyond one of two focal lengths extremities of a zooming range of the zoom lens to take a picture of an object at a closer object distance than an object distance at which an object can be taken in the zooming range;
   a second macro photographing mode in which the zoom lens is at least partially further advanced from an axial position corresponding to the first macro photographing mode to take a picture of an object at a closer object distance than the object distance at which a picture can be taken in said first macro photographing mode; and,
   a zoom finder, separate from the zoom lens for varying the field of view of the finder in accordance with a focal length of the zoom lens.

25. A camera according to claim 24, wherein said zoom finder reduces magnification in association with the movement of the zoom lens to said first macro photographing mode or said second macro photographing mode.

26. A camera according to claim 25, wherein an object distance in focus condition at said second macro photographing mode is fixed.

27. A camera according to claim 26, further comprising a camera body having a predetermined length of strap.

28. A camera according to claim 27, wherein said fixed object distance is determined by the length of the s trap.

29. A cam apparatus of a camera comprising:
   a cam plate which is reciprocally moved and which has cam grooves;
   an intermediate rotating lever which has cam follower pins engaged in associated cam grooves and which is rotatable about a shaft; and,
   a movable member which moves in association with the rotation of said intermediate rotating lever, said cam plate and said intermediate rotating lever being provided with an auxiliary cam groove and an auxiliary follower pin which can be engaged in said auxiliary cam groove during the movement of said cam plate to restrict the angular displacement of said intermediate rotating lever.

30. A cam apparatus of a camera according to claim 29, wherein said movable member is an illuminating angle varying member of a variable illuminating angle type of strobe device, so that said auxiliary cam groove and said auxiliary follower pin engage with each other, when said illuminating angle varying member is located at a wide angle extremity.

31. A real image type of finder device in which a real image formed by an objective optical system can be observed through an ocular optical system, comprising:
   reflecting member with a reflecting surface which is provided in the objective optical system to bend an optical Path of light incident thereon,
   wherein said reflecting member is rotatable about a shaft existing in the reflecting surface and sub normal to a plane which includes optical axes of light incident upon and reflected by the reflecting surface.

32. A finder device according to claim 31, wherein said plane is a horizontal plane.

33. A finder device according to claim 31, wherein said plane is a vertical plane.

34. A finder device according to claim 31, further comprising a mark which is provided at an image-forming position in which the rear image is formed by the objective optical system to indicate a sign for the adjustment of the field of view.

35. The camera according to claim 9, wherein said strap further comprising means for engaging said fixed object distance.

36. The camera according to claim 17, wherein said reflecting member is rotatable between at least first and second positions within the optical path of said finder.

37. The camera according to claim 31, wherein said reflecting member is rotatable between at least first and second positions within the optical path of said finder.

* * * * *

UNITED STATES PATENT AND TRADEMARK OFFICE
CERTIFICATE OF CORRECTION

PATENT NO. : 5,266,992

DATED : November 30, 1993

INVENTOR(S) : Y. TAKAOKA et al.

Page 1 of 3

It is certified that error appears in the above-indentified patent and that said Letters Patent is hereby corrected as shown below:

On the title page: in section [56]. "U.S. PATENT DOCUMENTS", please insert the following documents:

```
---4,298,251  11/1981   Hartmann   359/705
   3,882,514   5/1975   Graham     354/195.1
   4,806,000   2/1989   Shiokama   359/705---
```

Item : [56]
"Foreign Patent Documents", please insert the following documents:

```
---87-07038   11/1987    W.I.P.O.
   651143      9/1937    Fed. Rep. of Germany
   1776656     9/1958    Fed. Rep. of Germany
   2443230     8/1975    Fed. Rep. of Germany
   747843     10/1944    Fed. Rep. of Germany
   0521452     5/1940    United Kingdom
   2363765     6/1975    Fed. Rep. of Germany---
```

On the cover of the printed patent, in section [56], U.S. Patent Documents, line 10, change "222" to ---221---.

UNITED STATES PATENT AND TRADEMARK OFFICE
CERTIFICATE OF CORRECTION

PATENT NO. : 5,266,992
DATED : November 30, 1993
INVENTOR(S) : Y. TAKAOKA et al.

It is certified that error appears in the above-indentified patent and that said Letters Patent is hereby corrected as shown below:

At column 17, line 13 (claim 1, line 10) of the printed patent, change "int he" to ---in the---.

At column 17, line 33 (claim 3, line 4) of the printed patent, change "integrative" to ---inoperative---.

At column 17, line 34 (claim 3, line 5) of the printed patent, change "pistons" to ---positions---.

At column 18, line 6 (claim 9, line 3) of the printed patent, delete "by".

At column 18, line 33 (claim 14, line 5) of the printed patent, change "said plate" to ---said cam plate---.

At column 19, line 36 (claim 28, line 3) of the printed patent, change "s trap" to ---strap---.

At column 20, line 17 (claim 31, line 4) of the printed patent, before "reflecting member" insert ---a---.

UNITED STATES PATENT AND TRADEMARK OFFICE
CERTIFICATE OF CORRECTION

PATENT NO. : 5,266,992
DATED : November 30, 1993
INVENTOR(S) : Y. TAKAOKA et al.

It is certified that error appears in the above-indentified patent and that said Letters Patent is hereby corrected as shown below:

At column 20, line 19 (claim 31, line 6) of the printed patent, change "Path" to ---path---.

At column 20, line 21 (claim 31, line 8) of the printed patent, change "sub" to ---substantially---.

Signed and Sealed this

Tenth Day of December, 1996

Attest:

BRUCE LEHMAN

Attesting Officer

Commissioner of Patents and Trademarks